(12) United States Patent
Chui

(10) Patent No.: US 6,496,608 B1
(45) Date of Patent: Dec. 17, 2002

(54) IMAGE DATA INTERPOLATION SYSTEM AND METHOD

(75) Inventor: Charles K. Chui, Menlo Park, CA (US)

(73) Assignee: Picsurf, Inc., Mountain View, CA (US)

( * ) Notice: Subject to any disclaimer, the term of this patent is extended or adjusted under 35 U.S.C. 154(b) by 0 days.

(21) Appl. No.: 09/232,174

(22) Filed: Jan. 15, 1999

(51) Int. Cl.$^7$ .............................. G06K 9/36; G06K 9/32; H04N 7/01; H04N 1/41; H04N 1/46

(52) U.S. Cl. ...................... 382/300; 382/284; 382/293; 382/294; 382/298; 382/299; 348/453; 358/428; 358/525

(58) Field of Search .................................. 382/330, 299, 382/298, 295, 282, 255, 260, 263, 264, 275, 167, 151, 162, 160, 284, 291; 348/441, 272, 450, 538; 358/428, 525

(56) References Cited

U.S. PATENT DOCUMENTS 5,805,217 A * 9/1998 Lu et al. ...................... 348/273
5,821,999 A * 10/1998 Barnsley et al. ............. 348/272
5,995,154 A * 11/1999 Heimburger ................. 348/448

OTHER PUBLICATIONS

"Computation of Curves and Surfaces", by Dahmen et al., NATO ASI Series(Series C: Mathematical and Physical Sciences–vol. 307).

"Demosaicing in the Kodak DC210 Digital Camera", by Cleve Cheng, Psych 221/EE 362, Winter Quarter, http://www–ise.stanford.edu/class/psych221/98/demos.com, pp.1–9, 1997–8.

* cited by examiner

Primary Examiner—Leo Boudreau
Assistant Examiner—Yosef Kassa
(74) Attorney, Agent, or Firm—Pennie & Edmonds LLP

(57) ABSTRACT

A pixel filling system or method begins with an initial set of image data that is a subset of data values in a data array $f_{k,l}$ representing data values at corresponding positions (k,l). Some of the $f_{k,l}$ values are initially undefined, while others, at positions where both k and l are even numbers, have initially defined values. An interpolated value is generated for initially undefined $f_{k,l}$ values in accordance with the pixel filling filter equation:

$$f_{k,l} = \sum_{i,j} P_{k-2ni,l-2nj} d_{i,j}$$

wherein n is a positive integer, $d_{i,j}$ are the subset of $f_{k,l}$ values which have defined values prior to the generation of the interpolated $f_{k,l}$ values; $P_{k,l}$ are coefficients, no more than sixteen of which have non-zero values; and each non-zero $P_{k,l}$ coefficient is an integer divided by an integer power of two. The pixel values generated in accordance with the pixel filling filter equation represent a surface that is smooth, has continuous two-dimensional spatial first derivative, and preserves sharp edges, if any, in the initial set of image data. Further, if a local set of the initial data points $d_{i,j}$ (e.g., neighboring ones of the $f_{k/2,l/2}$ or $f_{k/4,l/4}$ points) all fall on a polynomial surface, the interpolated $f_{k,l}$ values that are located between the initial data points also fall on that same polynomial surface.

37 Claims, 13 Drawing Sheets

$$f_{k,l} = \Sigma_{i,j}\, P_{k-2i,l-2j}\, d_{i,j}$$

$$( P_{-3,0},\ P_{-1,0},\ P_{1,0},\ P_{3,0} ) = \tfrac{1}{16}(-1, 9, 9, -1)$$

Center Midpoint Pixel Filling Filter o    o    o    o -1    o    o

×    ×    ×    ×    ×    × o    o    o 2    o 8    o -1    o

Fill-in pixel = $f_{k,l}$

×    ×    ×    ×    ×    ×

$\times \frac{1}{16}$ o    o -1    o 8    o 2    o    o

×    ×    ×    ×    ×    × o    o    o -1    o    o    o

Horizontal, Near-Edge Midpoint
Pixel Filling Filter

|6     12    -2
o × o × o × o ×      $\times \frac{1}{16}$
|

Edge of Image

Center Quarter-Point Pixel Filling Filter

Fill-in pixel = $g_{r,s}$

```
o   x   o   x   o   x   o   x   o   x   o   x
x   x   x   x   x   x   x   x   x   x   x   x
o   x   o   x   o1  x   o   x   o   x   o   x
x   x   x   x   x   x4  x   x   x   x   x   x       × $\frac{1}{16}$
                        □
o   x   o-1 x   o12 x   o1  x   o   x   o   x
x   x   x   x   x   x   x   x   x   x   x   x
o   x   o   x   o-1 x   o   x   o   x   o   x
```

FIG. 8E

Center Quarter-Point Pixel Filling Filter

Fill-in pixel = $g_{r,s}$

```
o   x   o   x   o   x   o   x   o   x   o   x
x   x   x   x   x   x   x   x   x   x   x   x
o   x   o   x   o   x   o   x8  o-2 x   o   x
x   x   x   x   x   x  8x-□-x8  x   x   x   x       × $\frac{1}{32}$
o   x   o   x   o-1 x   o12 x   o1  x   o   x
x   x   x   x   x   x   x   x   x   x   x   x
o   x   o   x   o   x   o-2 x   o   x   o   x
```

FIG. 8F

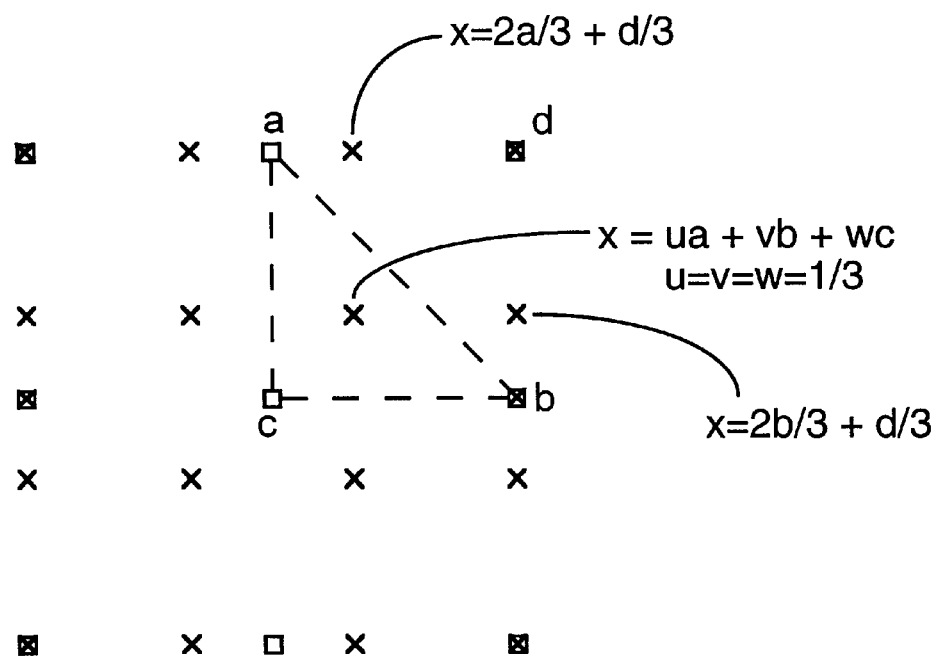

Barycentric interpolation for 9X magnficiation, with initial magnification and pixel filling at 4X magnification Legend:

- □ = position of pixel generated at 4X magnification and remapped, at 9X magnification, to a position between integer pixel positions
- × = pixel position initially assigned no value at 9X magnification
- ⊠ = pixel generated at 4X magnification and remapped to an integer pixel position at 9X magnification

FIG. 10

IMAGE DATA INTERPOLATION SYSTEM AND METHOD

The present invention relates generally to "filling in" the RGB data obtained from digital camera sensors, and to generating interpolated image data values when a digitally encoded image is magnified to a larger size, and particularly to a system and method for performing image data interpolations using spatially limited two-dimension "FIR-like" filters and yet generating images that appear continuous, undistorted and sharp.

BACKGROUND OF THE INVENTION

The present invention addresses two related problems: filling in RGB data obtained from digital camera sensors, and to generating interpolated image data values when a digitally encoded image is magnified to a larger size.

Referring to FIG. 1, the first problem concerns the fact that digital camera sensors generate only one color value (for red, green or blue) at each pixel position of the image, creating a pattern of red, green and blue pixels called a mosaic. The specific pattern shown in FIG. 2 is referred to as the Bayer mosaic pattern. However, all three R, G, B color values are needed for every pixel position to produce a full-color image. In this situation, when image data is first received from the camera sensor, only half the pixels in the image contain an intensity value for the color green, only one fourth of the pixels in the image contain an intensity value for the color blue, and only one fourth of the pixels in the image contain an intensity value for the color red. The goal is to produce the most "accurate" possible intensity values of the missing green, blue and red intensity values, essentially predicting what those intensity values would have been if the camera sensor had been able to record them.

Referring to FIG. 2, the second problem concerns the magnification of an image, such as by a factor of four (i.e., the width and height of the image are each doubled). In this situation, it is assumed that the system already has RGB or YUV values, or some other equivalent set of values, representing the initial set of image pixels. However, three fourths of the pixels in the magnified image initially have no image data values, and thus those values have to be generated from the information available in the original pixels (I), which have now been mapped to all the even index positions in the magnified image (J). For magnification factors other than four, the number of pixels that initially have no value will depend on the value of the magnification factor.

While there are literally hundreds of articles and patents addressing interpolation techniques for handling the missing RGB data problem and image data magnification, there are three primary image data interpolation techniques that are used in prior art systems: (1) pixel replication, (2) linear/bilinear interpolation, and (3) cubic/bicubic interpolation. Pixel replication is the simplest image data interpolation technique. In pixel replication, each interpolated pixel value is generated simply by replicating the value of a neighboring pixel in the initial set of pixels. The main advantage of pixel replication is that the interpolation is computationally very simple. The primary disadvantage of this technique is that the quality of the resulting image is poor.

In linear/bilinear interpolation, each interpolated pixel value is generated by essentially "averaging" the values of the two or four closest neighboring pixels in the initial set of pixels. Linear interpolation is used when performing data interpolation on a one-dimensional data set. Linear interpolation generates the interpolated pixel value based on the "average" of the values of the two closest neighboring pixels, one on the left and one on the right, and is a function having terms proportional to 1 and x, where x is the coordinate of the interpolated pixel value. Bilinear interpolation is used when performing image data interpolation on a two-dimensional image. Bilinear interpolation generates the interpolated pixel value based on the "average" of the four closest neighboring pixels, one in each of the northwest, northeast, southeast and southwest directions, and is a function having terms proportional to 1, x, y and xy, where x and y are the coordinates of the interpolated pixel value. Although the quality of the resulting image is better than that produced by pixel replication, the image quality is still relatively poor.

In cubic/bicubic interpolation, each interpolated pixel value is generated based on the values of all pixels in the initial set of pixels. Each interpolated pixel is set to a value such that the piecewise cubic polynomial (sometimes called a cubic spline) formed by the pixels in the resulting image has continuous first and second derivatives (i.e., has second order smoothness). Cubic interpolation is used when performing data interpolation on a one-dimensional data set. The interpolated pixel value generated using cubic interpolation is a function having 1, x, $x^2$ and $x^3$ terms, where x is the coordinate of the interpolated pixel value. Bicubic interpolation is used when performing image data interpolation on a two-dimensional image. The interpolated pixel value generated using bicubic interpolation is a function having 1, x, y, xy, $x^2$, $x^2y$, $x^2y^2$, $x^2y^3$, $x^3$, $x^3y$, $x^3y^2$ and $x^3y^3$ terms, where x and y are the coordinates of the interpolated pixel value. The quality of the image produced by cubic/bicubic interpolation is usually very good. Unfortunately, however, the computation and memory requirements of cubic/bicubic interpolation is very high because all pixel values in the image are required to generate each interpolated pixel value.

Goals of Present Invention

Goal 1: Low Distortion. Alternately stated, it is a goal to avoid the use of higher order cross terms, herein called "distortion" terms because they are responsible for introducing artifacts and distortions in interpolated image data. For bilinear interpolation, the distortion term is xy, having a "total power" of two. For biquadratic interpolation, the distortion terms are terms having a "total power" greater than two (namely $x^2y$, $xy^2$ and $x^2y^2$). For bicubic interpolation, the distortion terms are those having total power greater than three (namely $x^3y$, $x^3y^2$, $x^2y^2$, $x^3y^3$, $x^2y^3$ and $xy^3$) Distortion terms are undesirable because they increase the memory required to generate the interpolated image data and generate image artifacts along the diagonals of each rectangular region formed by any four adjacent pixels.

Goal 2: Smoothness. The interpolated image data should represent a smooth and continuous image surface, without discontinuities. If a group of original, neighboring image data points lie on a polynomial surface (e.g., plane or quadratic surface), the new interpolated image data points used to fill in holes between the original image data points should lie on the same polynomial surface.

Goal 3: Continuous turning tangent planes. The tangent planes of the image surface represented by the interpolated image data should be "continuously turning," without discontinuities. In other words, the two-dimensional spatial first derivative of the surface should be continuous, providing a surface without any sharp angles.

Goal 4: The tangent plane of the image surface represented by the interpolated image data at each location for which an interpolated value is generated should be substantially parallel (i.e., visually indistinguishable from a plane that is parallel) to a secant plane formed by adjacent ones of the data points corresponding to the initial data values.

Goals 1, 2 and 3 ensure that the image after interpolation is "pleasing" by minimizing the visibility of artifacts in the interpolated image such as lines. Goal 4 ensures that sharp lines in the image remain sharp or near sharp in the interpolated image.

SUMMARY OF THE INVENTION

In summary, the present invention is a system and method for generating interpolated pixel data values that begins with an initial image data set that is a subset of data values in a data array $f_{k,l}$ representing data values at corresponding positions (k,l). Some of the $f_{k,l}$ values are initially undefined, while others at positions where both k and l are even numbers have initially defined values.

For filling in midpoints (half way between pixels having assigned values), an interpolated value is generated for each initially undefined $f_{k,l}$ value in accordance with the pixel filling filter equation:

$$f_{k,l} = \sum_{i,j} P_{k-2i,l-2j} d_{i,j} \quad (1)$$

wherein $d_{i,j}$ are the subset of $f_{k,l}$ values which have defined values prior to the generation of the interpolated $f_{k,l}$ values;

$P_{k,l}$ are coefficients, no more than sixteen of which have non-zero values; and each non-zero $P_{k,l}$ coefficient is an integer divided by an integer power of two.

For filling in quarter points, a filter equation analogous to equation 1, but with 2i and 2j replaced by 4i and 4j is used. Alternately, filtering using equation is performed twice, but the resulting image will usually be less sharp.

The pixel values generated in accordance with the pixel filling filter equation have the following properties:

(A) the set of $f_{k,l}$ values (including the mapped $d_{i,j}$ values) represent a smooth surface that is continuous; whenever a local set of the initial data points $d_{i,j}$ (i.e., neighboring ones of the $f_{k,l}$ points where both k and l are even) all fall on a polynomial surface (e.g., plane or paraboloid), the interpolated $f_{k,l}$ values that are located between the initial data points also fall on that same polynomial surface;

(B) the surface represented by the set of $f_{k,l}$ values has a two-dimensional spatial first derivative that is continuous; and (C) the surface represented by the set of $f_{k,l}$ values has at each location (k,l) for which an interpolated value is generated a tangent plane that is parallel or substantially parallel to a secant plane formed by adjacent ones of the data points (k,l) corresponding to the initial data values $d_{i,j}$.

To magnify an image by a specified factor other than an integer power of four, the image is magnified in two stages. In the first stage the image is magnified by a factor that is smaller than the specified factor, but which is an integer power of four. (The first stage is skipped if the specified magnification factor is less than four.) The newly created pixels are generated using the pixel filling filter of the present invention. In the second stage the pixel values resulting from the first stage are remapped to new locations based on the specified magnification factor. This mapping will usually map some pixel values to non-pixel positions, and will always leave many pixel positions with no assigned pixel value. A new type of filter, herein called a "Barycentric interpolation filter," is used to compute pixel values at each of the pixel positions P not assigned a pixel value by the remapping. For each such pixel position P, a reference triangle is selected by selecting the three closest pixel values, at positions A, B and C, having pixel values a, b and c, respectively. The coordinates of those pixel values and the pixel position P for which a pixel value p is to be generated are mapped into the Barycentric coordinate system. The coordinates (u, v, w) of the pixel position P in the Barycentric coordinate system are then used as weights for generating a pixel value p=ua+vb+wc that lies on the plane that passes through the vertices A, B and C of the reference triangle.

BRIEF DESCRIPTION OF THE DRAWINGS

Additional objects and features of the invention will be more readily apparent from the following detailed description and appended claims when taken in conjunction with the drawings, in which:

FIG. 6A pertains to a horizontal midpoint pixel filling filter. FIG. 6B pertains to a vertical midpoint pixel filling filter. FIG. 6C pertains to a two-dimensional center midpoint pixel filling filter. FIGS. 6D and 6E represent edge-condition midpoint pixel filling filters for horizontal and center midpoints, and FIG. 6F pertains to a corner-condition center midpoint pixel filling filter.

FIGS. 8A–8G depict the non-zero coefficients and the pixel data values to which they are applied for two-level, quarter-point pixel filling filters. FIGS. 8A and 8B pertain to two different horizontal quarter-point pixel filling filters. FIGS. 8C and 8D pertain to two different vertical quarter-point pixel filling filters. FIGS. 8E, 8F and 8G pertain to three different two-dimensional center quarter-point pixel filling filters for three different classes of center quarter-point pixels.

FIG. 10 depicts the pixels generated by the method of FIG. 9 when an image is magnified by a factor of nine.

DESCRIPTION OF THE PREFERRED EMBODIMENTS

Digital Camera Embodiment

Figures 1, 2:
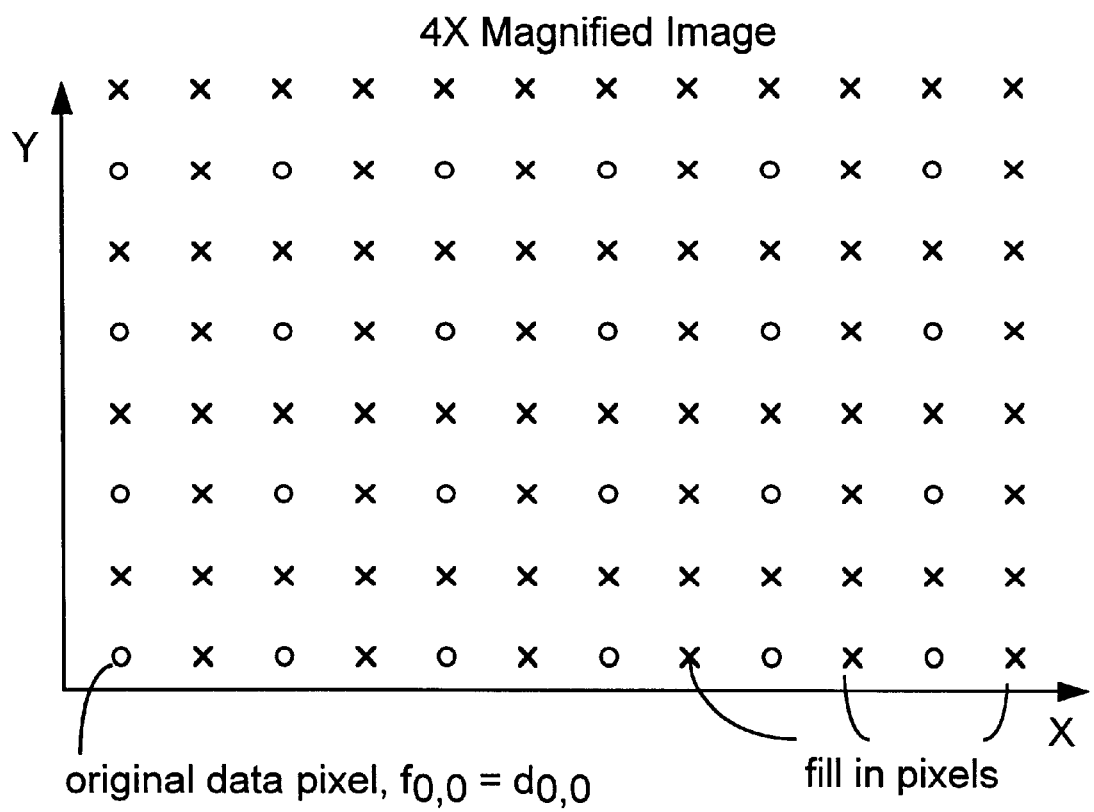
FIG. 1 represents the grid of R, G and B data values generated by a typical digital camera sensor.
FIG. 2 represents the original and "fill in" pixels of an image that has been magnified by a factor of four.
Figure 3:
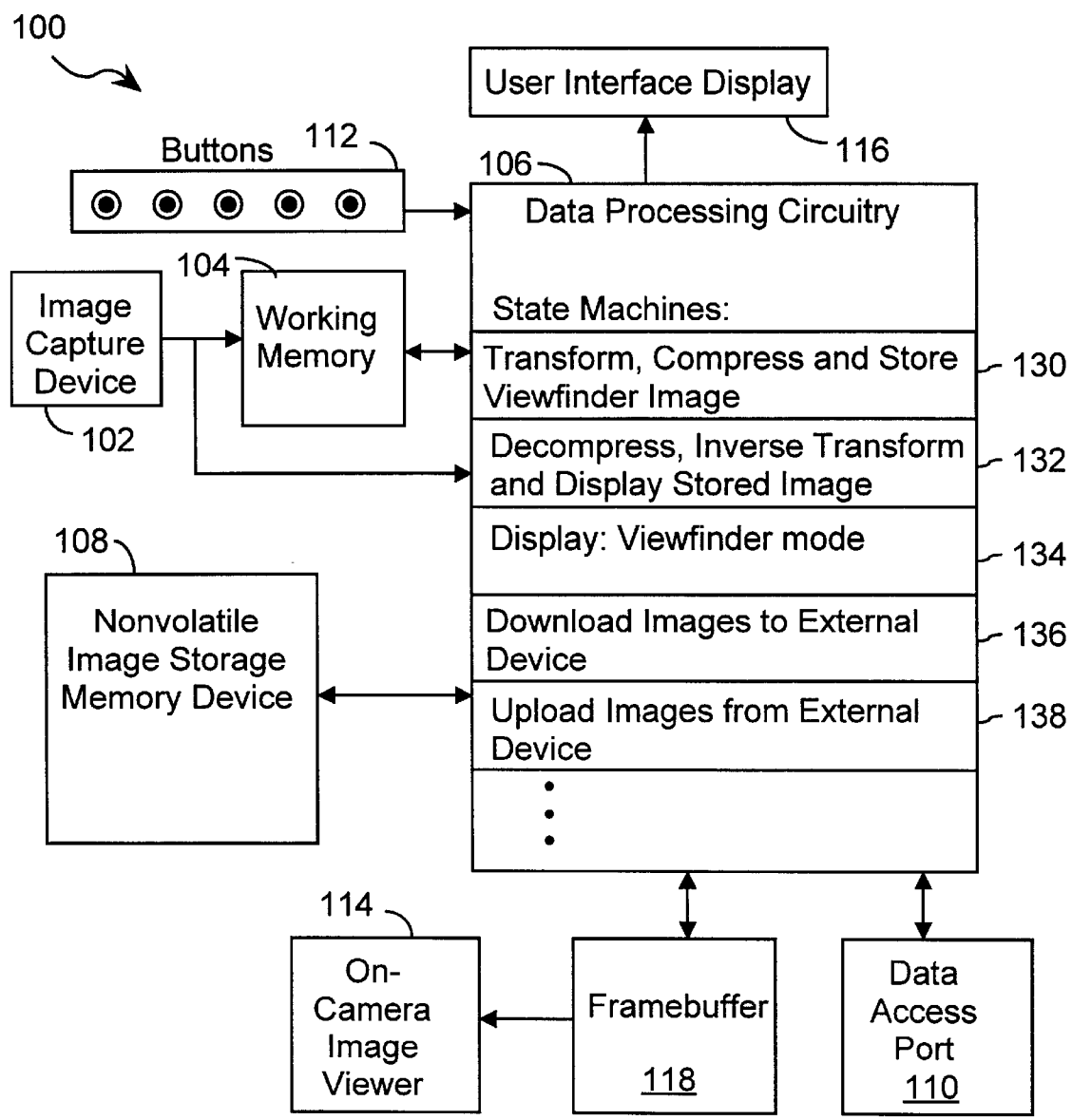
FIG. 3 is a block diagram of a digital camera incorporating an embodiment of the present invention.

Referring to FIG. 3, there is shown an embodiment of a digital camera system 100 in accordance with the present invention. The digital camera system 100 includes an image capture device 102, such as a CCD sensor array or any other mechanism suitable for capturing an image as an array of digitally encoded information. Thus the image capture device is assumed to include analog to digital conversion (ADC) circuitry for converting analog image information into digital values.

A working memory 104, typically random access memory, receives digitally encoded image information from the image capture device 102. More generally, it is used to store a digitally encoded image while the image is being transformed and compressed and otherwise processed by the camera's data (i.e., image) processing circuitry 106. The data processing circuitry 106 in one embodiment consists of hardwired logic and a set of state machines for performing a set of predefined image processing operations.

In alternate embodiments the data processing circuitry 106 could be implemented in part or entirely using a fast general-purpose microprocessor and a set of software procedures. However, at least using the technology available in 1998, it would be difficult to process and store full resolution images (e.g., full color images having 1280×840 pixels) fast enough to enable the camera to be able to take, say, 20 pictures per second, which is a requirement for some commercial products. If, through the use of parallel processing techniques or well designed software, a low voltage general-purpose image data microprocessor could support the fast image processing needed by digital cameras, then the data processing circuit 106 could be implemented using such a general-purpose microprocessor.

Each image, after having been processed by the data processing circuitry 106, is typically stored as an "image file" in a nonvolatile memory storage device 108, typically implemented using "flash" (i.e., EEPROM) memory technology. The nonvolatile memory storage device 108 is preferably implemented as a removable memory card. This allows the camera's user to remove one memory card, plug in another, and then take additional pictures. However, in some implementations, the nonvolatile memory storage device 108 may not be removable, in which case the camera will typically have a data access port 110 to enable the camera to transfer image files to and from other devices, such as general-purpose, desktop computers. Digital cameras with removable nonvolatile memory 108 may also include a data access port 10.

The digital camera 100 includes a set of buttons 112 for giving commands to the camera. In addition to the image capture button, there will typically be several other buttons to enable the use to select the quality level of the next picture to be taken, to scroll through the images in memory for viewing on the camera's image viewer 114, to delete images from the nonvolatile image memory 108, and to invoke all the camera's other functions. Such other functions might include enabling the use of a flash light source, and transferring image files to and from a computer. The buttons in one embodiment are electromechanical contact switches, but in other embodiments at least some of the buttons may be implemented as touch screen buttons on a user interface display 116, or on the image viewer 114.

The user interface display 116 is typically implemented either (A) as an LCD display device separate from the image viewer 114, or (B) as images displayed on the image viewer 114. Menus, user prompts, and information about the images stored in the nonvolatile image memory 108 may be displayed on the user interface display 116, regardless of how that display is implemented.

After an image has been captured, processed and stored in nonvolatile image memory 108, the associated image file may be retrieved from the memory 108 for viewing on the image viewer. More specifically, the image file is converted from its transformed, compressed form back into a data array suitable for storage in a framebuffer 118. The image data in the framebuffer is displayed on the image viewer 114.

The digital camera 100 preferably includes data processing circuitry 106 for performing a predefined set of primitive operations, such as performing the multiply and addition operations required to apply an "FIR-like" (finite impulse response-like) filter to a certain amount of image data, as well as a set of state machines 130–138 for controlling the data processing circuitry so as to perform a set of predefined image handling operations. In one embodiment, the state machines in the digital camera are as follows:

One or more state machines 130 for transforming, compressing and storing an image received from the camera's image capture mechanism. This image is sometimes called the "viewfinder" image, since the image being processed is generally the one seen on the camera's image viewer 114. This set of state machines 130 are the ones that initially generate each image file stored in the nonvolatile image memory 108. Prior to taking the picture, the user specifies the quality level of the image to be stored, using the camera's buttons 112. With respect to the present invention, this state machine controls the process of generating the "missing" RGB values not generated by the image capture device 102.

One or more state machines 132 for decompressing, inverse transforming and displaying a stored image file on the camera's image viewer. The reconstructed image generated by decompressing and inverse transforming the image data is stored in camera's frame buffer 118 so that it can be viewed on the image viewer 114.

One or more state machines 134 for implementing a "viewfinder" mode for the camera in which the image currently "seen" by the image capture mechanism 102 is displayed on the image viewer 114 to that the user can see the image that would be stored if the image capture button is pressed. These state machines transfer the image received from the image capture device 102, possibly after appropriate remedial processing steps are performed to improve the raw image data, to the camera's framebuffer 118. These state machines 134 also implement the image magnification portion of the present invention.

One or more state machines 136 for downloading images from the nonvolatile image memory 108 to an external device, such as a general-purpose computer.

One or more state machines 138 for uploading images from an external device, such as a general-purpose computer, into the nonvolatile image memory 108. This enables the camera to be used as an image viewing device, and also as a mechanism for transferring image files on memory cards.

The image capture and viewfinder state machines 130, 134 are preferably arranged in a pipeline so that RGB interpolation by the image capture state machine 130 and image enlargement by the viewfinder state machine 134 can be done in a pipeline, with image enlargement being performed on portions of the image without waiting for the entire image to be stored in memory. In this way, an image can be RGB interpolated and enlarged in about the same amount of processing time it would take to perform either of those operations alone.

General-Purpose Computer Implementation

Figure 4:
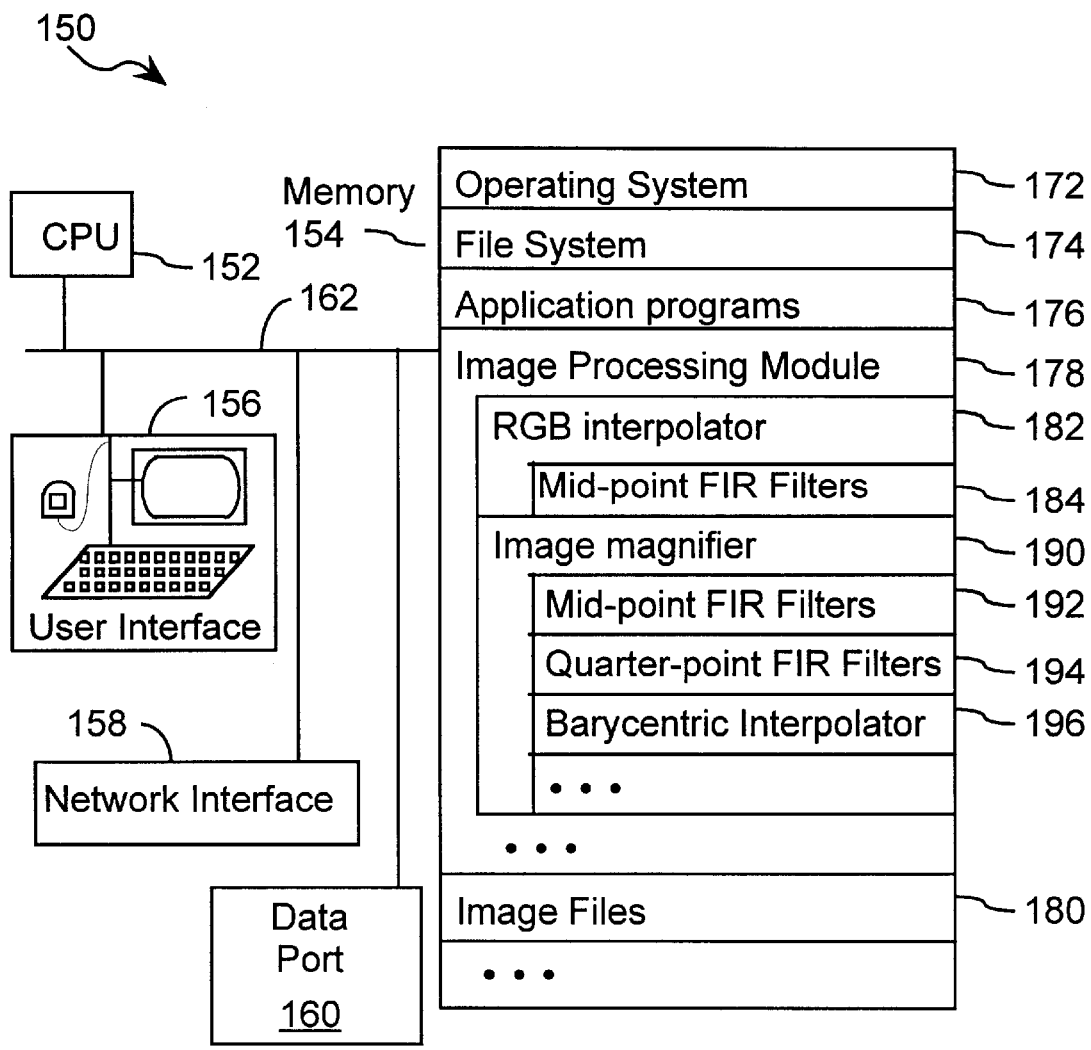
FIG. 4 is a block diagram of a general-purpose computer incorporating an embodiment of the present invention.

Referring to FIG. 4, the present invention may also be implemented using a programmed general-purpose computer system 150. The computer system 150 includes:

- one or more data processing units (CPU's) 152,
- memory 154, which will typically include both high speed random access memory as well as non-volatile memory;
- a user interface 156;
- a network or other communication interface 158 for communicating with other computers as well as other devices;
- a data port 160, such as for sending and receiving images to and from a digital camera (although such image transfers might also be accomplished via the network interface 158); and
- one or more communication busses 162 for interconnecting the CPU(s) 152, memory 154, user interface 156, network interface 158 and data port 160.

The computer system's memory 154 stores procedures and data, typically including:

- an operating system 172 for providing basic system services;
- a file system 174, which may be part of the operating system;
- application programs 176, such as user level programs for viewing and manipulating images,
- an image processing module 178, for performing various image processing functions including those that are the subject of the present document;
- image files 180 representing various images.

The image processing module 178 may include:

- an RGB interpolator 182 for converting a raw image file, in which each pixel only has a red, green or blue intensity value, into a full RGB image data file; and
- an image magnifier module 190.

The RGB interpolator 182, in turn, may include a set of midpoint pixel filling filters 184.

The image magnifier module 190, in turn, may include:

- a set of midpoint pixel filling filters 192;
- a set of quarter-point pixel filling filters 194; and
- a barycentric interpolator procedure 196.

In a preferred embodiment, the RGB interpolator 182 and the image magnifier module 190 are coupled in a pipeline-like manner so that RGB interpolation by the RGB interpolator 182 and image enlargement by the image magnifier module 190 are performed in overlapping time periods, with image enlargement being performed on portions of the image without waiting for the entire image to be first processed by the RGB interpolator 182. In this way, the system can display some portions of an enlarged image on the system's display device while it still processing (RGB interpolating and enlarging) other portions.

Filter Interpolation

The present invention achieves high quality image magnification, as well as RGB data value interpolation, while avoiding the computational complexity and extensive memory requirements of the bicubic interpolation technique. In particular, the present A invention uses "short" (i.e., spatially limited) two-dimensional finite impulse response (FIR)-like filters to generate interpolated image. data values. In virtually all cases, the number of "tap points" in the filter having non-zero coefficients is less than sixteen, and for midpoint interpolation values (as opposed to quarter-point interpolation values) the number of non-zero coefficients is in all cases is eighteen or less. In practice, the number of non-zero coefficients in most useful interpolation filters is generally twelve or less. Thus, compared to bicubic interpolation, which uses all data values in the entire image to generate, the present invention is very simple computationally. Furthermore, every coefficient of the pixel filling filters used in the present invention is equal to either an integer or an integer divided by an integer power of two. Thus, the interpolation values generated by the present invention can all be computed using bit shifters and adders. Multipliers, and especially floating point multipliers, are not needed.

Figure 5:
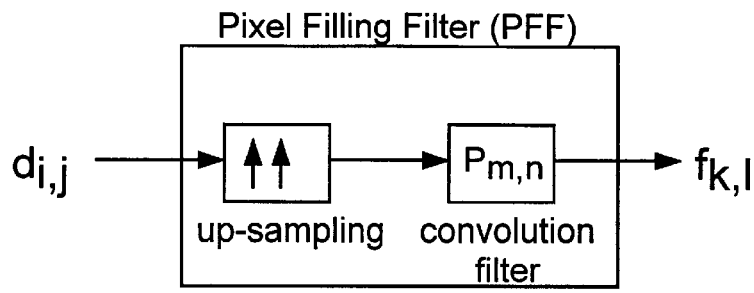
FIG. 5 depicts a pixel filling filter in accordance with the present invention.

Referring to FIG. 5, the basic technique for magnifying an image, or a portion of an image, is to "up-sample" the data and then apply a convolution filter to the up-sampled data. The combined operations are herein called a pixel filling filter (PFF). The up sampling step generates additional data points, usually called pixels. For a two-dimensional image magnified by a factor of four (i.e., by a factor of two in each dimension), up-sampling doubles the number of pixels in each spatial dimension and increases the total number of pixels by a factor of four. The input to the up-sampling filter are a two-dimensional set of data values herein labeled $d_{i,j}$, the output of the up sampling filter is a set of data values labeled $d_{k,l}^\sim$ and the output of the PFF is a set of data values labeled $f_{k,l}$.

For odd values of k and/or odd values of l, $d_{k,l}^\sim$ is equal to 0, and for even values of both k and l, $$f_{k,l} = d_{k,l}^\sim = d_{\frac{k}{2},\frac{l}{2}} \quad \text{for both k,l even} \qquad (2)$$

In other words, the original pixel data values at positions i,j are moved to positions 2i,2j, and all the "new" pixel data values are initially set to zero. Restated, $f_{2i,2j}=d_{i,j}$ for integer values of i and j that fall within the initial set of image data.

The PFF operates in accordance with the following filter formula:

$$f_{k,l} = \sum_{i,j} P_{k-2i,l-2j} d_{i,j} \qquad (3)$$

where $P_{k-2i,l-2j}$ are the coefficients of the filter. As indicated above, only a very small number of the filter coefficients $P_{k-2i,l-2j}$ have non-zero values, and further the positions of all the non-zero coefficients are relatively close to the fill-in pixel $f_{k,l}$. Furthermore, in the preferred embodiments, the sum of the non-zero coefficients used in Equation 3 above is always equal to one. Generally, when both k and l are even numbered values, such as 0,0 or 2,4, the only non-zero coefficient in Equation 3 above will be the $P_{0,0}$ coefficient, which is always equal to 1. When either k or l or both are odd numbered values, the $P_{0,0}$ coefficient is not used in Equation 3, because either k−2i or l−2j cannot be equal to zero.

In this document, the coefficients for the various Pixel Filling Filters will be shown in two forms: (A) a figure showing the non-zero coefficients and pixel data values to which they are applied, relative to the fill-in pixel data value being generated, and (B) an equation or matrix representation identifying the values of the non-zero coefficients. In both cases, the non-zero coefficients are used in pixel filling filter Equation 3 to generate interpolated pixel fill-in values.

Every one of the interpolation filters described below provides the following properties:

(A) Smoothness: the set of interpolated $f_{k,l}$ values (including the mapped $d_{i,j}$ values) represent a smooth surface that is continuous; if a local set of the initial data points $d_{i,j}$ (i.e., neighboring ones of the $f_{k,l}$ points where both k and l are even) all fall on a polynomial surface (e.g., plane or paraboloid), the interpolated $f_{k,l}$ values that are located between the initial data points also fall on that same polynomial surface;

(B) Continuous turning tangent planes: the surface represented by the set of interpolated $f_{k,l}$ values has a two-dimensional spatial first derivative that is continuous; and (C) Sharp edges: the surface represented by the set of interpolated $f_{k,l}$ values in conjunction with the $d_{i,j}$ values has at each location (k,l) for which an interpolated value is generated a tangent plane that is parallel or substantially parallel to a plane formed by adjacent ones of the data points (k,l) corresponding to data values $d_{i,j}$.

The phrase "a tangent plane substantially parallel to a second plane" is defined, for the purposes of this document to mean that the tangent plane is visually indistinguishable from a plane that is truly parallel to the second plane within the relevant area of the image (e.g., within a region of ten pixels in any direction from the interpolation point at which the tangent plane is defined). When the tangent plane at each interpolation point is substantially parallel to the secant plane defined by adjacent data points, sharp edges in the image data are preserved. For instance, if there is a sharp change in the color red between one region of an image and another region of the image (e.g., in an image of a red box sitting on a brown table), then the gradient of the red pixel values at each interpolation point between the two regions should be substantially equal to the gradient defined by the original data points.

Midpoint Pixel Filling Filters

The midpoint pixel filling filters are used to generate pixel fill-in values that are located exactly in the middle of two (or more) pixels that have assigned data values. Later in this document various "quarter-point" PFF's will be presented.

Horizontal and Vertical One-Dimensional Pixel Filling Filters

Figure 6A:
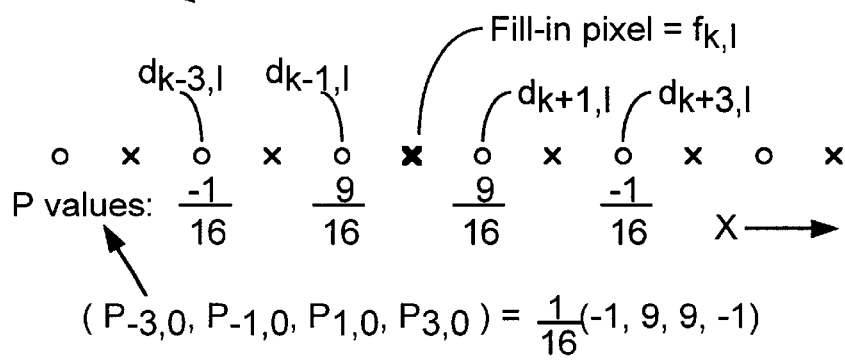
FIGS. 6A–6F depict the non-zero coefficients and the pixel data values to which they are applied for various midpoint pixel filling filters.
Figure 6B:
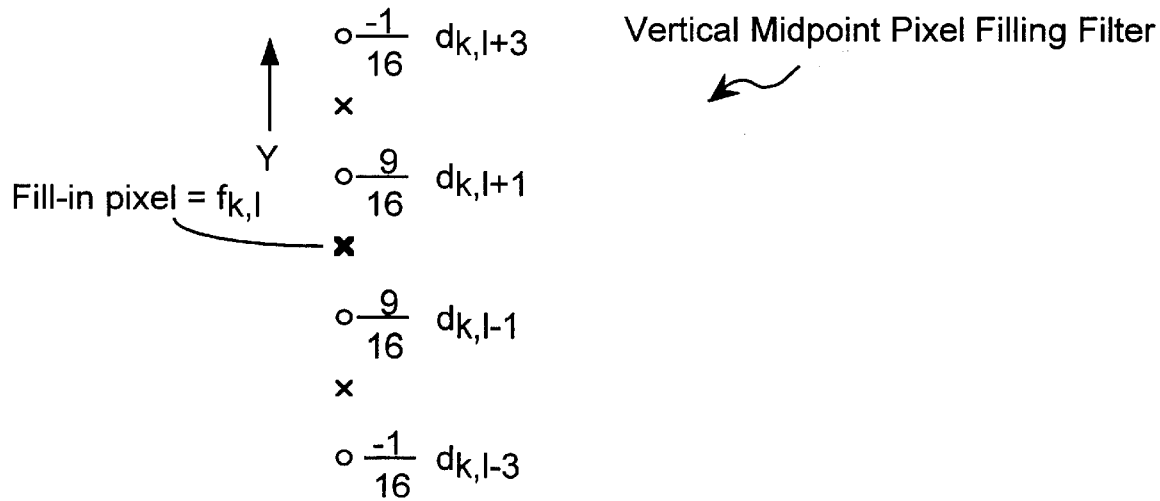

Referring to FIGS. 6A and 6B, the simplest of all the PFF's are the horizontal and vertical midpoint pixel filling filters. In FIG. 6A, the filter coefficient values are written next to the data points to which they would be applied (i.e., whose values they would be multiplied by). Using the convention that the fill-in pixel is located at position 0,0, the non-zero coefficient values for the horizontal midpoint PFF are:

$$(P_{-3,0}, P_{-1,0}, P_{1,0}, P_{3,0}) = \frac{1}{16}(-1, 9, 9, -1) \qquad (4)$$

All other coefficient values for the horizontal midpoint PFF are equal to zero. For every fill-in pixel value shown in FIG. 6A, except those closest to the edges of the image array, the fill-in value is determined by summing the four closest data points multiplied by the coefficients shown in FIG. 6A.

It should be noted that the pixels at locations having even numbered indices, such as $f_{0,0}$ and $f_{0,2}$ and the like, are assigned original image data values, and thus for these pixel locations the only non-zero PFF coefficient is $P_{0,0}$, which is equal to 1.

FIG. 6B shows the PFF coefficients for a vertical midpoint pixel filling filter. The non-zero coefficient values for the vertical midpoint PFF are:

$$(P_{0,-3}, P_{0,-1}, P_{0,1}, P_{0,3}) = \frac{1}{16}(-1, 9, 9, -1) \qquad (5)$$

All other coefficient values for the vertical midpoint PFF are equal to zero.

One practical application of the vertical midpoint PFF is for filling in rows (lines) of values between the horizontal scan lines of an interlaced video image. Each frame of such video images contain only half as many horizontal lines of pixel data as a full resolution image. In other words, the initial set of image data includes pixel values for alternating horizontal rows of the data array, and the other rows of the array initially do not have assigned pixel values. Using the vertical midpoint PFF of the present invention, each row (line) of missing pixel data is generated by filtering (in accordance with equation 5) the two lines of original data above and the two lines of original data below the line of data to be generated. The topmost and bottom missing lines of the image can be generated using simple averaging, or pixel replication, or even better, the non-symmetric edge-condition horizontal midpoint PFF of equation 9, discussed below.

Two-Dimensional "Center" Midpoint Pixel Filling Filters

Figure 6C:

FIG. 6C shows the PFF coefficients for a two-dimensional "center" midpoint pixel filling filter. This is the filter used to generate a data value for a pixel that is located at the center position between four data points, but is not at the same x or y position as any of those four data points. Using the convention that the fill-in pixel is located at position 0,0, the non-zero coefficient values in Equation 3 for the center midpoint PFF are:

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{16}\begin{pmatrix} 0 & 0 & -1 & 0 \\ 0 & 2 & 8 & -1 \\ -1 & 8 & 2 & 0 \\ 0 & -1 & 0 & 0 \end{pmatrix} \qquad (6)$$

All other coefficient values for the center midpoint PFF are equal to zero. It is noted that the sum of the non-zero coefficients for this PFF, as well as all other PFF's in the preferred embodiment, is equal to one.

Other embodiments of the center midpoint PFF include one with the same coefficients, except reversed with respect to either the X or Y axis (either reversal produces the exact same alternate PFF):

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{16}\begin{pmatrix} 0 & -1 & 0 & 0 \\ -1 & 8 & 2 & 0 \\ 0 & 2 & 8 & -1 \\ 0 & 0 & -1 & 0 \end{pmatrix} \qquad (7)$$

Reversing the filter with respect to both the X and Y axes reproduces the original filter. Another embodiment of the center midpoint PFF includes one that is the average of the PFF filter described above and the one where the coefficients are reversed with respect to either axis. The coefficients for that embodiment are:

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{32} \begin{pmatrix} 0 & -1 & -1 & 0 \\ -1 & 10 & 10 & -1 \\ -1 & 10 & 10 & -1 \\ 0 & -1 & -1 & 0 \end{pmatrix} \quad (8)$$

This averaged center midpoint PFF filter generates truer contour curves than the other two presented above, but requires more computation (because it has twelve non-zero coefficients) and produces edges that are less sharp.

More generally, for every PFF described in this document except those for generating pixel fill-in values near the edge or corner of an image data array, the invention also includes versions in which the coefficients have been reversed with respect to either the X or Y axis, and in some cases the invention also includes a PFF whose coefficients are equal to the average of the described filter coefficients with the coefficients reversed with respect to one axis.

One- and Two-Dimensional "Edge" and "Corner" Midpoint Pixel Filling Filters

Figure 6D:

FIG. 6D depicts a pixel filling filter for a horizontal midpoint that is near an edge of the image data array. Using the convention that the fill-in pixel is located at position 0,0, the non-zero coefficient values for the edge-condition horizontal midpoint PFF are:

$$(P_{-3,0}, P_{-1,0}, P_{1,0}, P_{3,0}) = \frac{1}{16}(-2, 12, 6, 0) \quad (9)$$

Figure 6E:
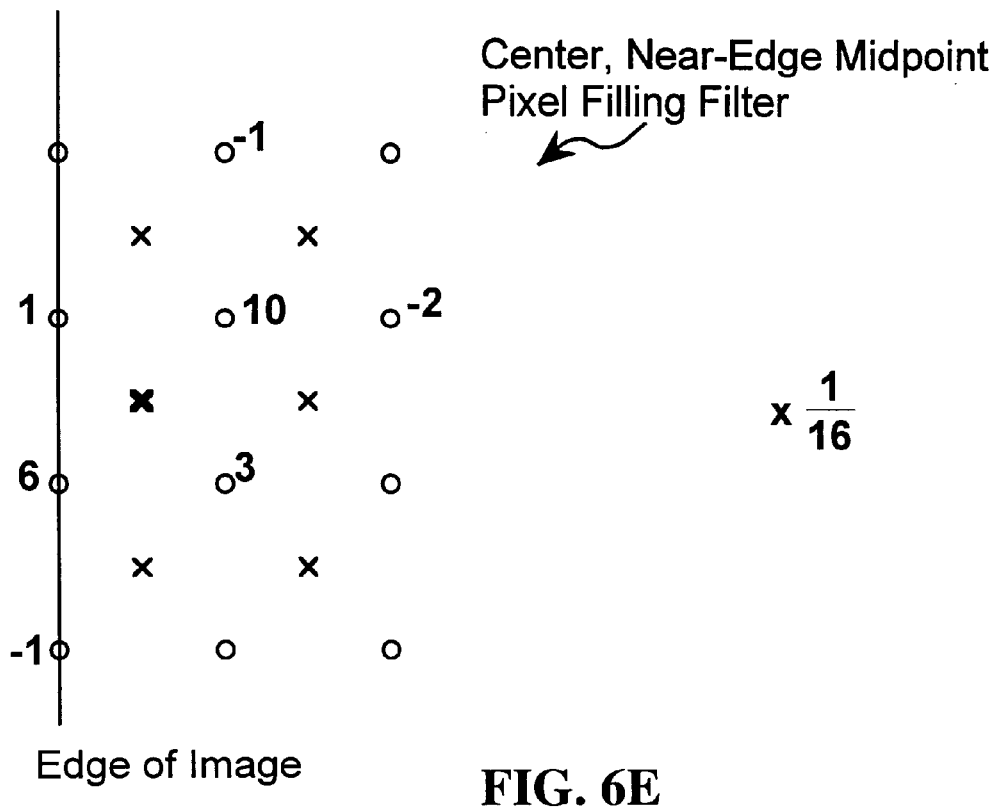

FIG. 6E depicts a pixel filling filter for a center midpoint that is near the left edge of the image data array. The non-zero coefficient values for the center, near-edge midpoint PFF are:

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{16} \begin{pmatrix} 0 & 0 & -1 & 0 \\ 0 & 3 & 6 & 0 \\ -2 & 10 & 1 & 0 \\ 0 & -1 & 0 & 0 \end{pmatrix} \quad (10)$$

Figure 6F:
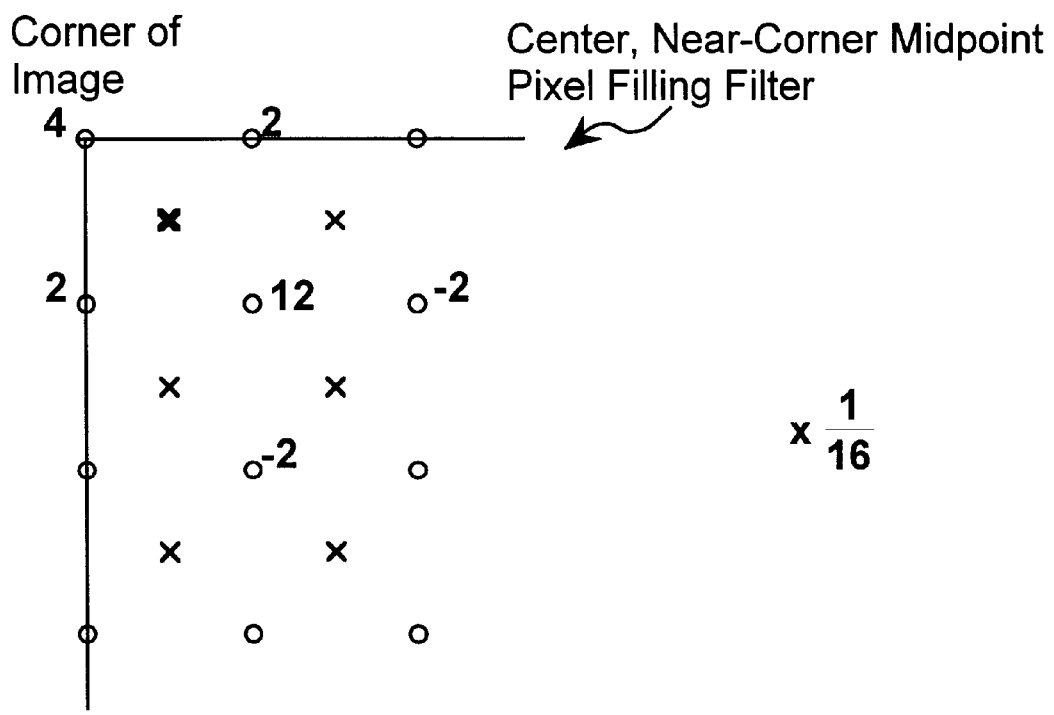

FIG. 6F depicts a pixel filling filter for a center midpoint that is near a corner of the image data array. The non-zero coefficient values for the center, near-corner midpoint PFF are:

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{16} \begin{pmatrix} 0 & 0 & 0 & 0 \\ 0 & 2 & 4 & 0 \\ -2 & 12 & 2 & 0 \\ 0 & -2 & 0 & 0 \end{pmatrix} \quad (11)$$

The above-described midpoint PFF's are used to generate an RGB image from image data provided by a digital camera sensor. Referring to FIGS. 1 and 6A–6F, the red, green and blue fill-in pixel values of the RGB image are generated as follows:

(A) To interpolate the value of a red fill-in pixel at the position of a green pixel G, the non-zero coefficient values of the horizontal midpoint PFF shown in FIG. 6A or the vertical midpoint PFF shown in FIG. 6B are used. The non-zero coefficient values of the horizontal midpoint PFF are used when the red pixels R closest to the red fill-in pixel have the same X coordinate as the red fill-in pixel. The non-zero coefficient values of the vertical midpoint PFF are used when the red pixels R closest to the red fill-in pixel have the same Y coordinate as the red fill-in pixel. The non-zero coefficient values are applied to a set of corresponding red pixels R adjacent to the red fill-in pixel in the image. The set of corresponding red pixels R are those red pixels R in the image that have the same position relative to the fill-in pixel as the non-zero coefficient value data points.

(B) To interpolate the value of a red fill-in pixel at the position of a blue pixel B, the non-zero coefficient values of the center midpoint PFF shown in FIG. 6C are used. The non-zero coefficient values are applied to a set of corresponding red pixels R adjacent to the red fill-in pixel in the image. The set of corresponding red pixels R are those red pixels R in the image that have the same position relative to the fill-in pixel as the non-zero coefficient value data points.

(C) To interpolate the value of a green fill-in pixel at the position of either a red pixel R or a blue pixel B, the non-zero coefficient values of the center midpoint PFF shown in FIG. 6C are used. However, in this case, the midpoint PFF is rotated 45° clockwise with respect to the orientation shown in FIG. 6C, resulting the following set of PFF coefficients:

$$\begin{pmatrix} P_{-1,2} & P_{0,2} & P_{1,2} \\ P_{-1,1} & P_{0,1} & P_{1,1} \\ P_{-1,0} & P_{0,0} & P_{1,0} \\ P_{-1,-1} & P_{0,-1} & P_{1,-1} \\ P_{-1,2} & P_{0,-2} & P_{1,-2} \end{pmatrix} = \frac{1}{16} \begin{pmatrix} -1 & 0 & -1 \\ 0 & 8 & 0 \\ 2 & 0 & 2 \\ 0 & 8 & 0 \\ -1 & 0 & -1 \end{pmatrix} \quad (12)$$

Since only green pixels are used in the PFF processing, and they are positioned in a checkerboard patter, the filter coefficients are also arranged in a checkerboard pattern. As usual, all filter coefficients not shown above are equal to 0. In an alternate embodiment, the filter coefficients shown in Equation 12 can be rotated 90°.

The non-zero coefficient values are applied to a set of corresponding green pixels G adjacent to the green fill-in pixel in the image. The set of corresponding green pixels G are those green pixels G in the image that have the same position relative to the fill-in pixel as the non-zero coefficient value data points.

(D) To interpolate the value of a blue fill-in pixel at the position of a red pixel R, the non-zero coefficient values of the center midpoint PFF shown in FIG. 6C are used. The non-zero coefficient values are applied to a set of corresponding blue pixels B adjacent to the blue fill-in pixel in the image. The set of corresponding blue pixels B are those blue pixels B in the image that have the same position relative to the fill-in pixel as the non-zero coefficient value data points.

(F) To interpolate the value of a blue fill-in pixel at the position of a green pixel G, the non-zero coefficient values of the horizontal midpoint PFF shown in FIG. 6A or the vertical midpoint PFF shown in FIG. 6B are used. The non-zero coefficient values of the horizontal midpoint PFF are used when the blue pixels B closest to the blue fill-in pixel have the same X coordinate as the blue fill-in pixel. The non-zero coefficient values of the vertical midpoint PFF are used when the blue pixels B closest to the blue fill-in pixel have the same Y coordinate as the blue fill-in pixel. The non-zero coefficient values are applied to a set of corresponding blue pixels B adjacent to the blue fill-in pixel in the image. The set of corresponding blue pixels B are those blue pixels B in the image that have the same position relative to the fill-in pixel as the non-zero coefficient value data points.

In the digital camera embodiment described above, the interpolation of the red, green and blue fill-in pixel values is performed by the data processing circuitry 106 of the digital camera system 100. In the computer system embodiment mentioned earlier, the fill-in pixel interpolation is performed by the image processing module 178 of the general-purpose computer system 150.

Quarter-Point Pixel Filling Filters

A more general filter equation for PFF than equation 3 above is:

$$f_{k,l} = \sum_{i,j} P_{k-2ni,l-2nj} d_{i,j} \tag{13}$$

where n is a positive integer (with typical values being 1, 2 and 4), and $P_{k,l}$ are the coefficients of the filter. This generalized equation basically indicates that the fill in pixels are based on a set of evenly spaced (at least with respect to the index values) original pixels.

Figure 7A:
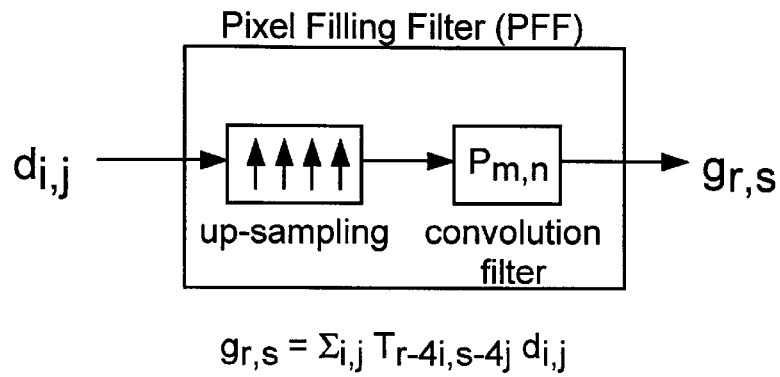
FIGS. 7A and 7B depict two embodiments of a pixel filling filter for computing fill-in pixel values for an image that has been magnified by a factor of sixteen (i.e., by a factor of four in each dimension).

Referring to FIG. 7A there is shown a pixel filling filter for computing fill-in pixel values for an image that has been magnified by a factor of sixteen. The general pixel filling formula for generating the fill-in pixel values is as follows:

$$g_{r,s} = \sum_{i,j} T_{r-4i, s-4j} d_{i,j} \tag{14}$$

The digital image represented by the $g_{r,s}$ values has the same properties as those discussed above with respect to the midpoint pixel filling filter.

Figure 7B:
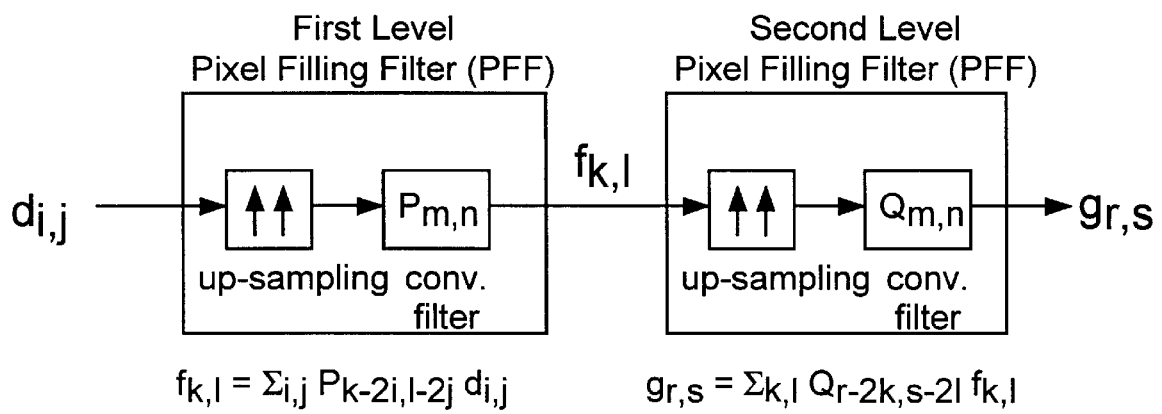

FIG. 7B shows a two-level pixel filling filter for accomplishing the same level of magnification. In this second embodiment, fill-in pixel values $f_{k,l}$ are first computed for all the midpoints in accordance with the midpoint PFF's described above. Those fill-in pixel values are then available for computation of the quarter-pointer fill-in pixels $g_{r,s}$ in accordance with a second level pixel filling filter equation:

$$g_{r,s} = \sum_{k,l} Q_{r-2k, s-2l} f_{k,l} \tag{15}$$

In this second implementation, the second level filter could, potentially, use PFF's identical to those used in the first level filter. However, in the preferred embodiment, the second level filter uses a different set of PFF coefficients $Q_{r,s}$, because re-use of the first level filter coefficients causes the resulting picture to lose its sharpness. The coefficients $Q_{r,s}$ of the second level filter are selected to preserve sharp edges in the image being magnified.

Therefore, our attention will now focus on the embodiment shown in FIG. 7B.

Figure 8A:
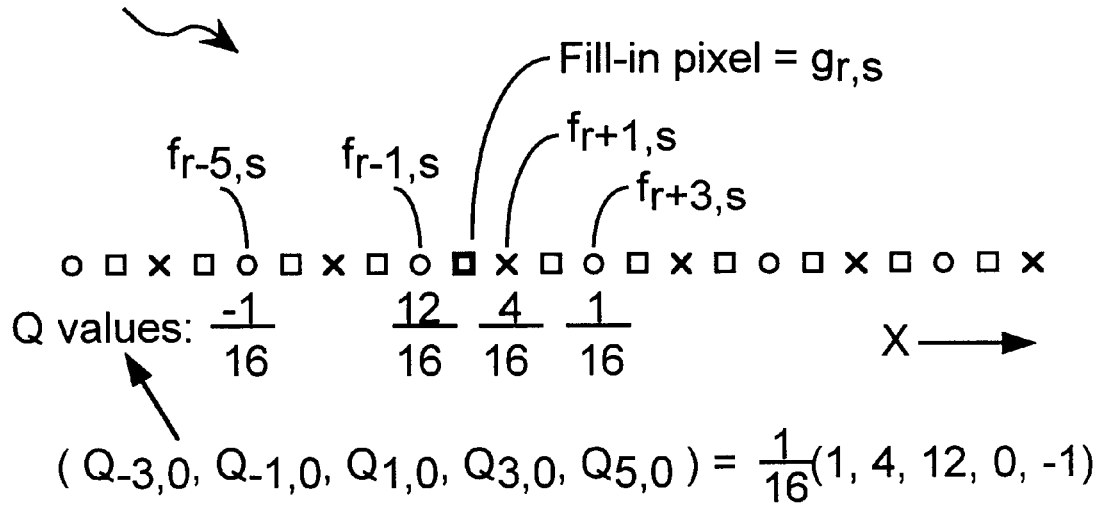

FIG. 8A depicts a horizontal quarter-point pixel filling filter for use when the closest original data point is to the left of the quarter-point whose value is being determined. Using the convention that the fill-in pixel is located at position 0,0, the non-zero coefficient values for this horizontal quarter-point PFF are:

$$(Q_{-3,0}, Q_{-1,0}, Q_{1,0}, Q_{3,0}, Q_{5,0}) = \frac{1}{16}(1, 4, 12, 0, -1) \tag{16}$$

All other coefficient values for the horizontal quarter-point PFF are equal to zero.

Figure 8B:
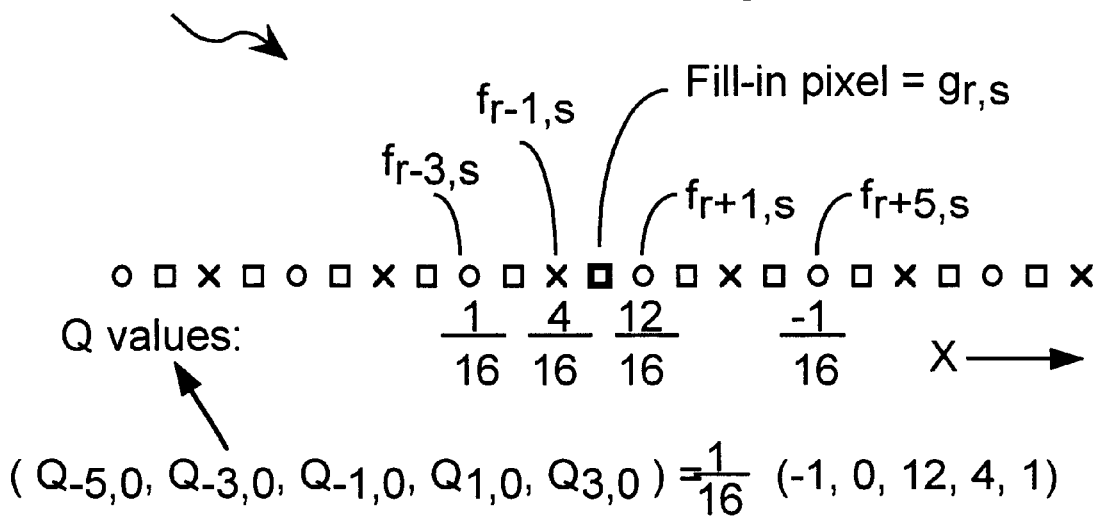

FIG. 8B depicts a horizontal quarter-point pixel filling filter for use when the closest original data point is to the right of the quarter-point whose value is being determined. The non-zero coefficient values for this horizontal quarter-point PFF are:

$$(Q_{-5,0}, Q_{-3,0}, Q_{-1,0}, Q_{1,0}, Q_{3,0}) = \frac{1}{16}(-1, 0, 12, 4, 1) \tag{17}$$

For every quarter-point fill-in pixel value shown in FIGS. 8A and 8B, except those closest to the edges of the image array, the fill-in value is determined by summing four of the five closest data points multiplied by the coefficients shown in the figures.

Figure 8C:
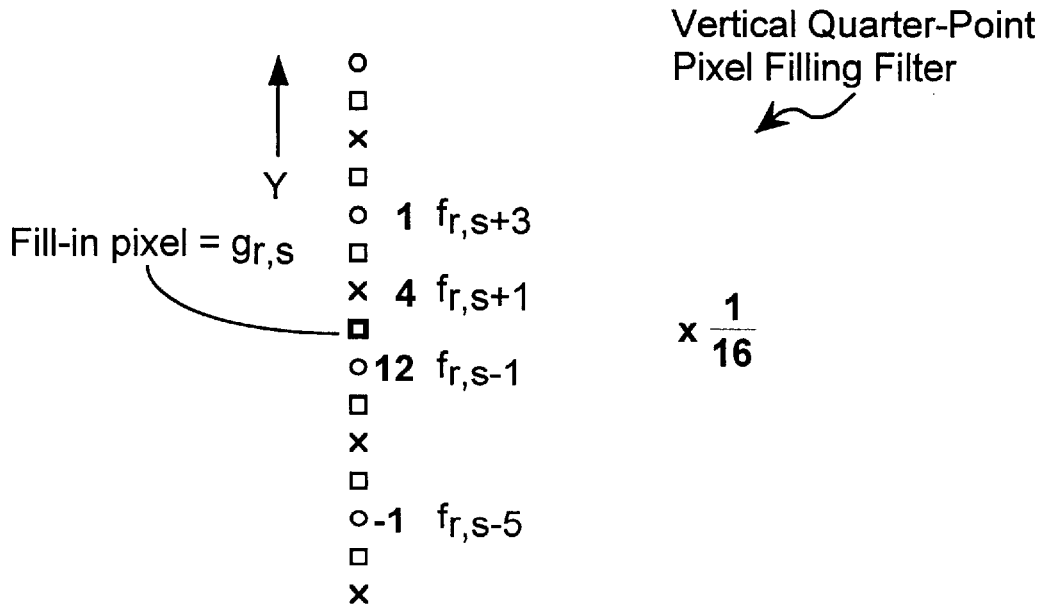

FIG. 8C depicts a vertical quarter-point pixel filling filter for use when the closest original data point is below the quarter-point whose value is being determined. The non-zero coefficient values for this vertical quarter-point PFF are:

$$(Q_{0,-3}, Q_{0,-1}, Q_{0,1}, Q_{0,3}, Q_{0,5}) = \frac{1}{16}(1, 4, 12, 0, -1) \tag{18}$$

Figure 8D:
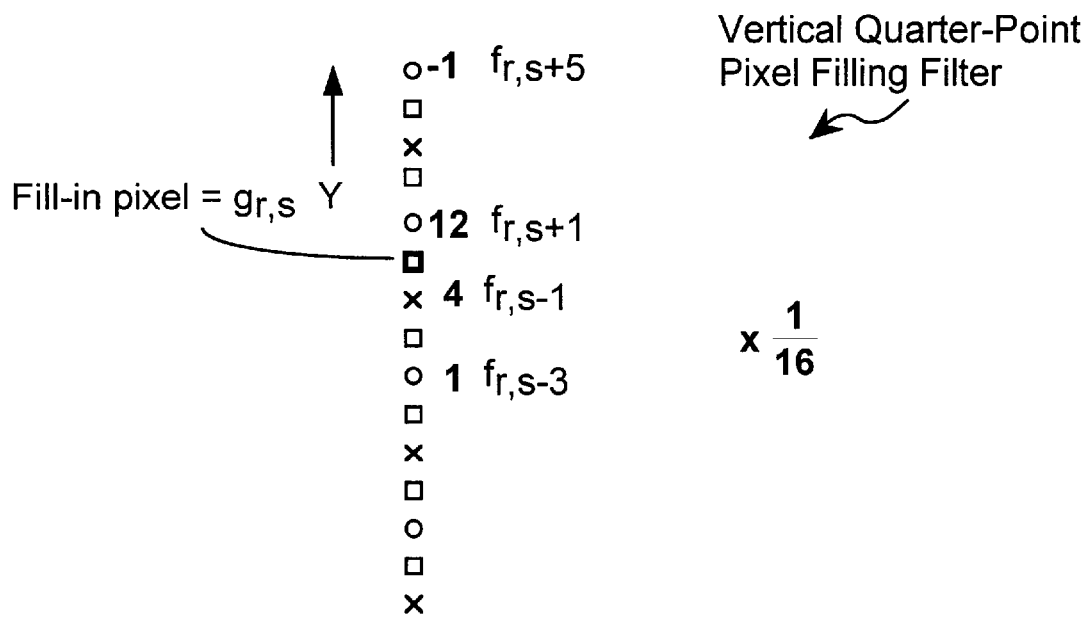

FIG. 8D depicts a vertical quarter-point pixel filling filter for use when the closest original data point is above the quarter-point whose value is being determined. The non-zero coefficient values for this vertical quarter-point PFF are:

$$(Q_{0,-5}, Q_{0,-3}, Q_{0,-1}, Q_{0,1}, Q_{0,3}) = \frac{1}{16}(-1, 0, 12, 4, 1) \tag{19}$$

Figure 8G:
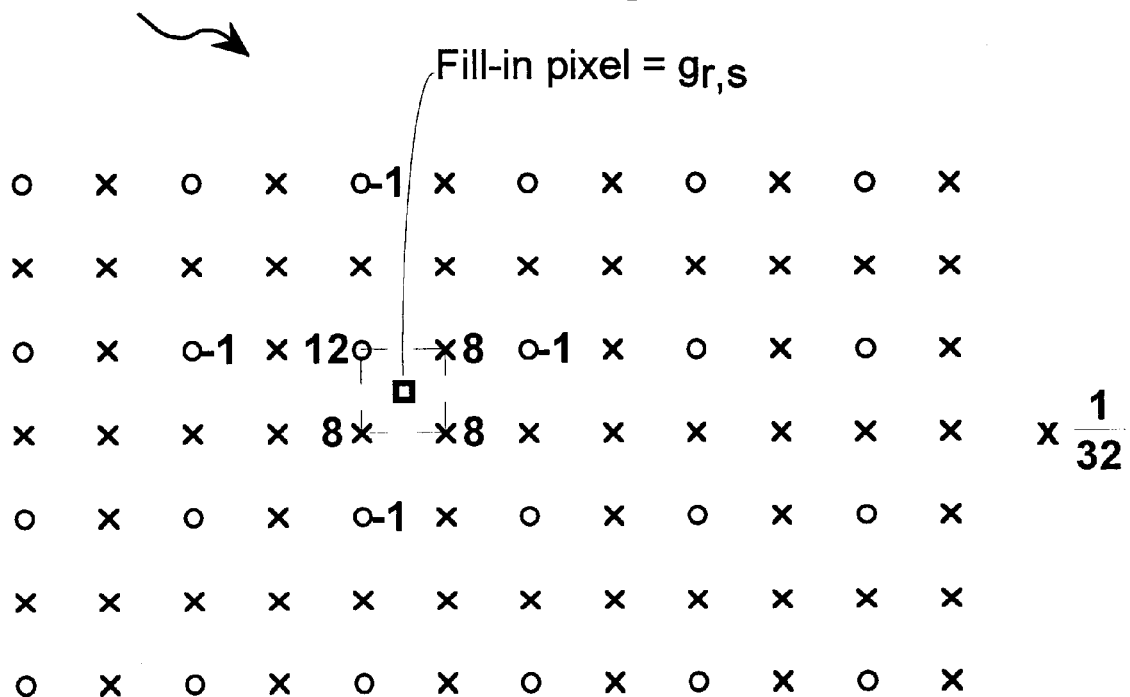

FIGS. 8E, 8F and 8G depict three different two-dimensional center quarter-point pixel filling filters for three different classes of center quarter-point pixels. When the quarter-point whose value is being generated is located on a diagonal line between one original data point and one midpoint as shown in FIG. 8E, the non-zero PFF coefficients are:

$$\begin{pmatrix} Q_{-3,5} & Q_{-1,5} & Q_{1,5} & Q_{3,5} & Q_{5,5} \\ Q_{-3,3} & Q_{-1,3} & Q_{1,3} & Q_{3,3} & Q_{5,3} \\ Q_{-3,1} & Q_{-1,1} & Q_{1,1} & Q_{3,1} & Q_{5,1} \\ Q_{-3,-1} & Q_{-1,-1} & Q_{1,-1} & Q_{3,-1} & Q_{5,-1} \\ Q_{-3,-3} & Q_{-1,-3} & Q_{1,-3} & Q_{3,-3} & Q_{5,-3} \end{pmatrix} = \frac{1}{16} \begin{pmatrix} 0 & 0 & -1 & 0 & 0 \\ 0 & 0 & 0 & 0 & 0 \\ 1 & 0 & 12 & 0 & -1 \\ 0 & 4 & 0 & 0 & 0 \\ 0 & 0 & 1 & 0 & 0 \end{pmatrix} \tag{20}$$

When the quarter-point whose value is being generated is located on a horizontal line between two midpoints, but is not horizontally colinear with any original data points, as shown in FIG. 8F, the non-zero PFF coefficients are:

$$\begin{pmatrix} Q_{-3,6} & Q_{-1,6} & Q_{1,6} & Q_{3,6} & Q_{5,6} \\ Q_{-3,4} & Q_{-1,4} & Q_{1,4} & Q_{3,4} & Q_{5,4} \\ Q_{-3,2} & Q_{-1,2} & Q_{1,2} & Q_{3,2} & Q_{5,2} \\ Q_{-3,0} & Q_{-1,0} & Q_{1,0} & Q_{3,0} & Q_{5,0} \\ Q_{-3,-2} & Q_{-1,-2} & Q_{1,-2} & Q_{3,-2} & Q_{5,-2} \end{pmatrix} = \tag{21}$$

-continued $$\frac{1}{32}\begin{pmatrix} 0 & 0 & -2 & 0 & 0 \\ 0 & 0 & 0 & 0 & 0 \\ 1 & 0 & 12 & 0 & -1 \\ 0 & 8 & 8 & 0 & 0 \\ -2 & 8 & 0 & 0 & 0 \end{pmatrix}$$

When the quarter-point whose value is being generated is located in the middle between one original data point and three midpoints that together form a square (with the quarter-point in the middle of the square), as shown in FIG. 8G, the non-zero PFF coefficients are:

$$\begin{pmatrix} Q_{-3,3}, & Q_{-1,3}, & Q_{1,3}, & Q_{3,3}, & Q_{5,3} \\ Q_{-3,1}, & Q_{-1,1}, & Q_{1,1}, & Q_{3,1}, & Q_{5,1} \\ Q_{-3,-1}, & Q_{-1,-1}, & Q_{1,-1}, & Q_{3,-1}, & Q_{5,-1} \\ Q_{-3,-3}, & Q_{-1,-3}, & Q_{1,-3}, & Q_{3,-3}, & Q_{5,-3} \\ Q_{-3,-5}, & Q_{-1,-5}, & Q_{1,-5}, & Q_{3,-5}, & Q_{5,-5} \end{pmatrix} = \tag{22}$$

$$\frac{1}{32}\begin{pmatrix} 0 & 0 & -1 & 0 & 0 \\ 0 & 8 & 8 & 0 & 0 \\ -1 & 8 & 12 & 0 & -1 \\ 0 & 0 & 0 & 0 & 0 \\ 0 & 0 & -1 & 0 & 0 \end{pmatrix}$$

It is noted that FIG. 8G and 8E are different. The PFF for FIG. 8G is not the same as the PFF for FIG. 8E because the PFF is generally symmetric only for fill-in points that are symmetric with respect to axes parallel to the x=y diagonal and is not symmetric with respect to fill-in points that are symmetric with respect to either the horizontal or vertical axes.

Quarter-Point PFF Using Only Original Data Points

As indicated above in the discussion of FIG. 7A, the quarter-point fill-in pixel values can be computed solely from the original data points, using Equation 14. The following are the pixel filling coefficients for Equation 14, for each of the quarter-point positions for the fill-in pixel.

When the closest original data point is to the left of the quarter-point whose value is being determined, as shown in FIG. 8A, the non-zero coefficient values for the horizontal quarter-point PFF are:

$$(T_{-7,0}, T_{-3,0}, T_{-1,0}, T_{5,0}) = \frac{1}{64}(-1, 13, 57, -5) \tag{23}$$

As before, the coefficient values use the convention that the fill-in pixel is located at position 0,0.

When the closest original data point is to the right of the quarter-point whose value is being determined, as shown in FIG. 8B, the non-zero coefficient values for the horizontal quarter-point PFF are:

$$(T_{-5,0}, T_{-1,0}, T_{3,0}, T_{7,0},) = \frac{1}{64}(-5, 57, 13, -1) \tag{24}$$

When the closest original data point is below the quarter-point whose value is being determined, as shown in FIG. 8C, the non-zero coefficient values for the vertical quarter-point PFF are:

$$(T_{0,-7}, T_{0,-3}, T_{0,-1}, T_{0,5}) = \frac{1}{64}(-1, 13, 57, -5) \tag{25}$$

When the closest original data point is above the quarter-point whose value is being determined, as shown in FIG. 8D, the non-zero coefficient values for the vertical quarter-point PFF are:

$$(T_{0,-5}, T_{0,-1}, T_{0,3}, T_{0,7}) = \frac{1}{64}(-5, 57, 13, -1) \tag{26}$$

When the quarter-point whose value is being generated is located on a diagonal line between two original data points, as shown in FIG. 8E, the non-zero PFF coefficients for the center quarter-point PFF are:

$$\begin{pmatrix} T_{-7,5}, & T_{-3,5}, & T_{1,5}, & T_{5,5} \\ T_{-7,1}, & T_{-3,1}, & T_{1,1}, & T_{5,1} \\ T_{-7,-3}, & T_{-3,-3}, & T_{1,-3}, & T_{5,-3} \\ T_{-7,-7}, & T_{-3,-7}, & T_{1,-7}, & T_{5,-7} \end{pmatrix} = \frac{1}{128}\begin{pmatrix} 0 & -1 & -8 & 0 \\ -2 & 21 & 100 & -8 \\ -1 & 10 & 21 & -1 \\ 0 & -1 & -2 & 0 \end{pmatrix} \tag{27}$$

When the quarter-point whose value is being generated is located on a horizontal line between two midpoints, but is not horizontally colinear with any original data points, as shown in FIG. 8F, the non-zero PFF coefficients for the center quarter-point PFF are:

$$\begin{pmatrix} T_{-7,6}, & T_{-3,6}, & T_{1,6}, & T_{5,6} \\ T_{-7,2}, & T_{-3,2}, & T_{1,2}, & T_{5,2} \\ T_{-7,-2}, & T_{-3,-2}, & T_{1,-2}, & T_{5,-2} \\ T_{-7,-6}, & T_{-3,-6}, & T_{1,-6}, & T_{5,-6} \end{pmatrix} = \frac{1}{128}\begin{pmatrix} 0 & -1 & -7 & 0 \\ -2 & 17 & 61 & -4 \\ -2 & 17 & 61 & -4 \\ 0 & -1 & -7 & 0 \end{pmatrix} \tag{28}$$

When the quarter-point whose value is being generated is located in the middle between one original data point and three midpoints that together form a square (with the quarter-point in the middle of the square), as shown in FIG. 8G, the non-zero PFF coefficients for the center quarter-point PFF are:

$$\begin{pmatrix} T_{-7,7}, & T_{-3,7}, & T_{1,7}, & T_{5,7} \\ T_{-7,3}, & T_{-3,3}, & T_{1,3}, & T_{5,3} \\ T_{-7,-1}, & T_{-3,-1}, & T_{1,-1}, & T_{5,-1} \\ T_{-7,-5}, & T_{-3,-5}, & T_{1,-5}, & T_{5,-5} \end{pmatrix} = \frac{1}{128}\begin{pmatrix} 0 & -1 & -2 & 0 \\ -1 & 10 & 21 & -1 \\ -2 & 21 & 100 & -8 \\ 0 & -1 & -8 & 0 \end{pmatrix} \tag{29}$$

Pixel Filling when Image Magnification is not an Integer Power of Four

To magnify an image by a specified factor other than an integer power of four, the image is magnified in two stages. In the first stage the image is magnified by a factor that is smaller than the specified factor, but which is an integer power of four. (The first stage is skipped if the specified magnification factor is less than four.) The newly created pixels are generated using the pixel filling filter of the present invention. In the second stage the pixel values resulting from the first stage are remapped to new locations based on the specified magnification factor. This mapping will usually map some pixel values to non-pixel positions, and will always leave many pixel positions with no assigned pixel value. A new type of filter, herein called a "Barycentric interpolation filter," is used to compute pixel values at each of the pixel positions P not assigned a pixel value by the remapping. For each such pixel position P, a reference triangle is selected by selecting the three closest pixel values, at positions A, B and C, having pixel values a, b and c, respectively. The coordinates of those pixel values and the pixel position P for which a pixel value p is to be generated are mapped into the Barycentric coordinate system. The coordinates (u, v, w) of the pixel position P in the Barycentric coordinate system are then used as weights for generating a pixel value p=ua+vb+wc that lies on the plane that passes through the vertices A, B and C of the reference triangle.

Figure 9:
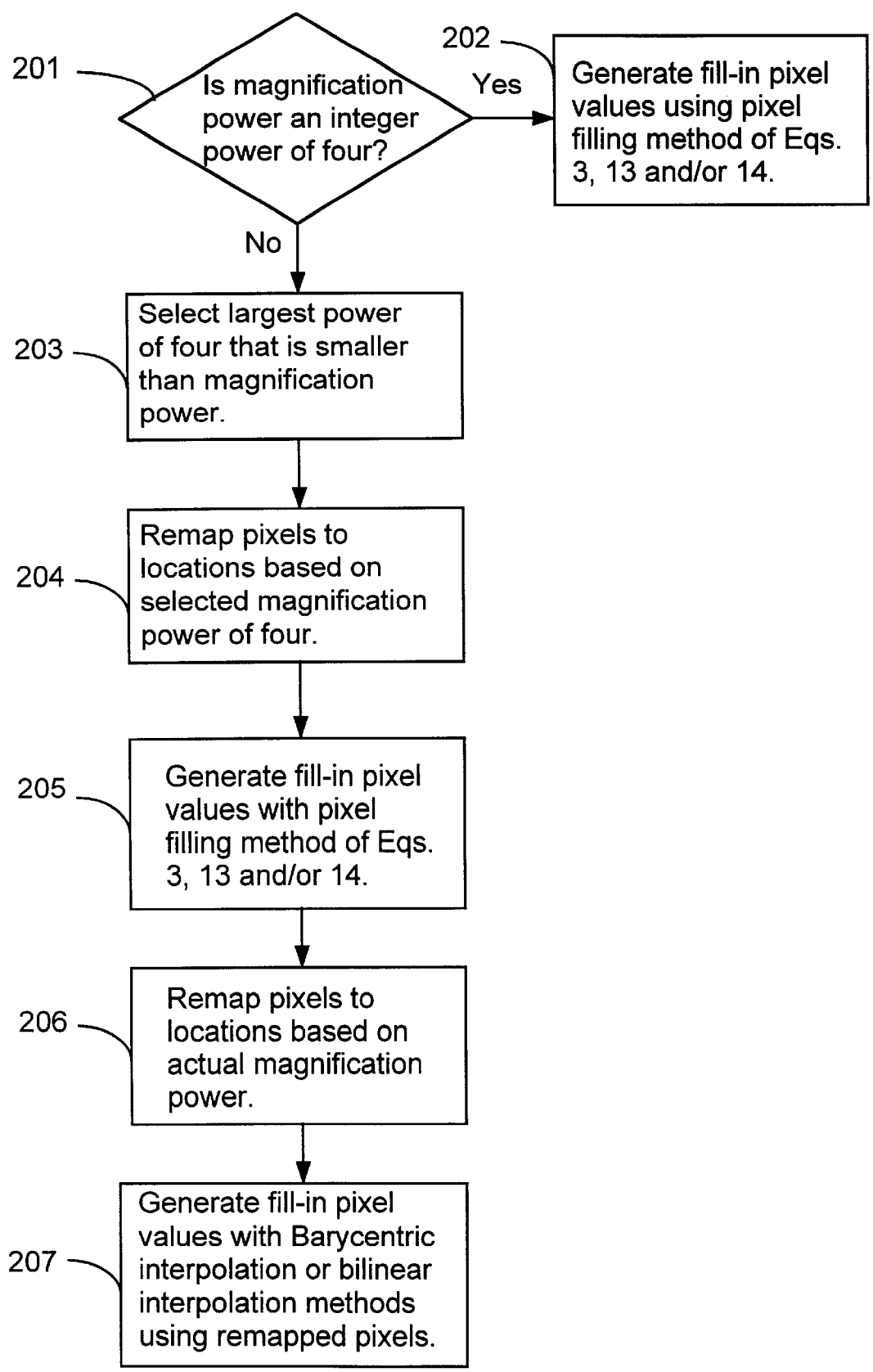
FIG. 9 is a flow chart depicting a method of generating pixel data values when an image is magnified by a factor that is not equal to an integer power of four.

More specifically, FIG. 9 is a flow chart of the method of generating pixel data values when an image is magnified by a factor that is not equal to an integer power of four. In step 201, determine whether the magnification power is an integer power of four. If not, in step 203, select the largest power of four that is smaller than the magnification power. In step 204, remap the original pixels $d_{k,l}$ to locations based on the selected magnification power of four, as described earlier; in other words, magnify the image by the selected magnification power of four. In step 205, generate a fill-in pixel value $f_{k,l}$ at each pixel location with the pixel filling method of Equations 3, 14 and/or 15, as described earlier. In step 206, remap the pixels to locations based on the actual magnification power; in other words, magnify the image by the actual magnification power. In step 207, generate a fill-in pixel value at each pixel location with a Barycentric interpolation method using the remapped pixels. The fill-in pixel values are used to form the magnified image. The Barycentric interpolation method performs the interpolation by applying Barycentric coordinate weights, as described in the next section of this document. The Barycentric interpolation method comprises two steps: (1) select a reference triangle having vertices at three remapped pixels at the actual magnification power (from step 206) closest to the pixel location P and (2) generate the fill-in pixel value p at the pixel location with Barycentric interpolation using the three closest remapped pixels.

In an alternate embodiment, linear spline interpolation can be used in place of Barycentric interpoloation.

Barycentric Interpolation

Barycentric interpolation as applied to the problem of image magnification is explained next.

FIG. 10 depicts the pixels generated by the method of FIG. 9 when an image is magnified by a factor of nine (i.e., three times in each dimension). Initially the image is magnified by a factor of four and the fill in pixel values at that magnification are generated using the techniques described above. Those pixels are then remapped to positions at a 9× magnification, resulting in some pixel values being mapped to integer pixel positions and some being mapped to non-integer positions. The square boxes with x's in them represent pixel values mapped to integer pixel positions, the empty square boxes represent pixel values mapped to non-integer pixel positions, and the x's represent integer pixel positions to which no value in initially assigned when the 4× pixels are initially mapped to their 9× magnification positions. As can be seen, some of the unassigned integer pixel positions are either horizontally colinear or vertically colinear with remapped pixel values, and those pixel positions are assigned values using simple linear interpolation. In other words, in this particular situation, Barycentric interpolation is identical to simple linear interpolation. Pixel positions that are not horizontally or vertically colinear with remapped pixel values are assigned values using the Barycentric interpolation formula:

$$x = ua + vb + wc$$

where u+v+w=1 and pixel values a, b and c represent the three pixels closest to the pixel position for which an interpolated value is being generated. The three closest pixels will, in general, form a triangle with the "selected" pixel (i.e., the one for which an interpolated pixel value is being generated) falling in the interior of the triangle. In this particular case, u=v=w=1/3. More generally, at other magnifications, (u,v,w) are generated in accordance with the equations:

$$u = \frac{(x_2 y_3 - x_3 y_2) + (x_3 y - xy_3) + (xy_2 - x_2 y)}{(x_2 y_3 - x_3 y_2) + (x_3 y_1 - x_1 y_3) + (x_1 y_2 - x_2 y_1)}$$

$$v = \frac{(xy_3 - x_3 y) + (x_3 y_1 - x_1 y_3) + (x_1 y - xy_1)}{(x_2 y_3 - x_3 y_2) + (x_3 y_1 - x_1 y_3) + (x_1 y_2 - x_2 y_1)}$$

$$w = \frac{(x_2 y - xy_2) + (xy_1 - x_1 y) + (x_1 y_2 - x_2 y_1)}{(x_2 y_3 - x_3 y_2) + (x_3 y_1 - x_1 y_3) + (x_1 y_2 - x_2 y_1)}$$

where $(x_1,y_1)$, $(x_2,y_2)$ and $(x_3,y_3)$ are the locations of the three pixels whose position and values define the plane (in three dimensional space) on which the location (x,y) is supposed to be located. It is noted that the denominators of the equations for u, v and w are identical, and that the numerators are linear with respect to both x and y.

RGB Data Compression

After performing interpolation as described above, to generate the red, green and blue values not generated by the image sensor, the resulting image data can be compressed by converting it to YUV (or $YC_bC_r$) data and then applying standard luminance/chrominance compression techniques to generate a compressed image file. When the file is decompressed, the resulting decompressed YUV is then reconverted back to RGB format.

In a second embodiment, the pixels data generated by the image sensor is divided into even and odd rows. Interpolation, as described above, is performed to generate the red, green and blue values not generated by the image sensor. In this embodiment, after the RGB values are converted to YUV (or $YC_bC_r$) data, the pixel data for the even rows is compressed separately from the pixel data for the odd rows, and the two sets of compressed data are stored together as an image file. When the file is decompressed, the resulting decompressed YUV for the odd and even rows are merged, and the resulting matrix of values is then reconverted back to RGB format.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of generating interpolated pixel data values, comprising:

providing an initial set of image data, comprising a subset of data values in a data array $f_{k,l}$ representing data values at corresponding positions (k,l); such that some of the $f_{k,l}$ values are initially undefined;

generating an interpolated value for each of a plurality of initially undefined $f_{k,l}$ values in accordance with the filter equation:

$$f_{k,l} = \sum_{i,j} P_{k-2ni,l-2nj} d_{i,j}$$

wherein
n is a positive integer;
$d_{i,j}$ are the subset of $f_{k,l}$ values which have defined values prior to the generation of the interpolated $f_{k,l}$ values, such that $f_{2ni,2nj}=d_{i,j}$ for integer values of i and j that fall within the initial set of image data;
$P_{k,l}$ are coefficients, no more than eighteen of which have non-zero values;
each non-zero $P_{k,l}$ coefficient is an integer divided by an integer power of two; and
the set of interpolated $f_{k,l}$ values in conjunction with the $d_{i,j}$ values represent a smooth surface that is continuous, and that has a two-dimensional spatial first derivative that is continuous.

2. The method of claim 1, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a plane formed by adjacent ones of the data points (k,l) corresponding to data values $d_{i,j}$.

3. The method of claim 1, wherein
whenever a local contiguous set of the initial data values $d_{i,j}$ all fall on a polynomial surface, the interpolated $f_{k,l}$ values that are located between the initial data points also fall on that same polynomial surface.

4. The method of claim 1, wherein the non-zero $P_{k,l}$ coefficients, when summed, have an associated sum equal to 1.

5. An image processing apparatus for generating interpolated pixel data values, comprising:
an image memory for storing an initial set of image data, comprising a subset of data values in a data array $f_{k,l}$ representing data values at corresponding positions (k,l); such that some of the $f_{k,l}$ values are initially undefined; and
data processing circuitry coupled to the image memory for generating an interpolated value for each of a plurality of initially undefined $f_{k,l}$ values in accordance with the filter equation:

$$f_{k,l} = \sum_{i,j} P_{k-2ni,l-2nj} d_{i,j}$$

wherein
n is a positive integer;
$d_{i,j}$ are the subset of $f_{k,l}$ values which have defined values prior to the generation of the interpolated $f_{k,l}$ values, such that $f_{2ni,2nj}=d_{i,j}$ for integer values of i and j that fall within the initial set of image data;
$P_{k,l}$ are coefficients, no more than eighteen of which have non-zero values;
each non-zero $P_{k,l}$ coefficient is an integer divided by an integer power of two; and
the set of interpolated $f_{k,l}$ values in conjunction with the $d_{i,j}$ values represent a smooth surface that is continuous, and that has a two-dimensional spatial first derivative that is continuous.

6. The image processing apparatus of claim 5, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a plane formed by adjacent ones of the data points (k,l) corresponding to data values $d_{i,j}$.

7. The image processing apparatus of claim 5, wherein
whenever a local contiguous set of the initial data values $d_{i,j}$ the interpolated $f_{k,l}$ values that are located between the initial data points also fall on that same polynomial surface.

8. The image processing apparatus of claim 5, wherein the non-zero $P_{k,l}$ coefficients, when summed, have an associated sum equal to 1.

9. The image processing apparatus of claim 5, wherein
the data processing circuitry applies a two-dimensional center midpoint pixel filling filter to generate a data value $f_{k,l}$ at a position (k,l) that is located at a center position in the data array between four positions of the data array which have defined values, but which is not at the same k or l position in the data array as any of those four positions;
the only non-zero coefficients $P_{k,l}$ in the applied pixel filling filter are selected from the set consisting of:

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{16} \begin{pmatrix} 0 & 0 & -1 & 0 \\ 0 & 2 & 8 & -1 \\ -1 & 8 & 2 & 0 \\ 0 & -1 & 0 & 0 \end{pmatrix} \text{ and}$$

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{16} \begin{pmatrix} 0 & -1 & 0 & 0 \\ -1 & 8 & 2 & 0 \\ 0 & 2 & 8 & -1 \\ 0 & 0 & -1 & 0 \end{pmatrix} \text{ and}$$

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{32} \begin{pmatrix} 0 & -1 & -1 & 0 \\ -1 & 10 & 10 & -1 \\ -1 & 10 & 10 & -1 \\ 0 & -1 & -1 & 0 \end{pmatrix}.$$

10. The image processing apparatus of claim 5, wherein
the data processing circuitry applies a two-dimensional center midpoint pixel filling filter to generate a data value $f_{k,l}$ at a position (k,l) that is located at a center position in the data array between four positions of the data array which have defined values, but which is not at the same k or l position in the data array as any of those four positions;
when, the position (k,l) is near a left edge of the data array, the only non-zero coefficients $P_{k,l}$ in the applied pixel filling filter, are:

$$\begin{pmatrix} P_{-3,3} & P_{-1,3} & P_{1,3} & P_{3,3} \\ P_{-3,1} & P_{-1,1} & P_{1,1} & P_{3,1} \\ P_{-3,-1} & P_{-1,-1} & P_{1,-1} & P_{3,-1} \\ P_{-3,-3} & P_{-1,-3} & P_{1,-3} & P_{3,-3} \end{pmatrix} = \frac{1}{16} \begin{pmatrix} 0 & 0 & -1 & 0 \\ 0 & 3 & 6 & 0 \\ -2 & 10 & 1 & 0 \\ 0 & -1 & 0 & 0 \end{pmatrix}.$$

11. The image processing apparatus of claim 5, wherein
the data processing circuitry applies a two-dimensional center midpoint pixel filling filter to generate a data value $f_{k,l}$ at a position (k,l) that is located at a center position in the data array between four positions of the data array which have defined values, but which is not at the same k or l position in the data array as any of those four positions;

when the position (k,l) is near a top left corner of the image data array, the only non-zero coefficients $P_{k,l}$ in the applied pixel filling filter, are:

$$\begin{pmatrix} P_{-3,3}, & P_{-1,3}, & P_{1,3}, & P_{3,3} \\ P_{-3,1}, & P_{-1,1}, & P_{1,1}, & P_{3,1} \\ P_{-3,-1}, & P_{-1,-1}, & P_{1,-1}, & P_{3,-1} \\ P_{-3,-3}, & P_{-1,-3}, & P_{1,-3}, & P_{3,-3} \end{pmatrix} = \frac{1}{16} \begin{pmatrix} 0 & 0 & 0 & 0 \\ 0 & 2 & 4 & 0 \\ -2 & 12 & 2 & 0 \\ 0 & -2 & 0 & 0 \end{pmatrix}.$$

12. The image processing apparatus of claim 5, wherein the initial set of image data includes red, green and blue pixel values arranged in the data array in a Bayer mosaic pattern;

the data processing circuitry applies a two-dimensional center midpoint pixel filling filter to generate a data value $f_{k,l}$ at a position (k,l) representing a green pixel value at a position in the data array initially assigned only a blue or red pixel value; and the only non-zero coefficients $P_{k,l}$ in the applied pixel filling filter, are:

$$\begin{pmatrix} P_{-1,2}, & P_{0,2}, & P_{1,2} \\ P_{-1,1}, & P_{0,1}, & P_{1,1} \\ P_{-1,0}, & P_{0,0}, & P_{1,0} \\ P_{-1,-1}, & P_{0,-1}, & P_{1,-1} \\ P_{-1,-2}, & P_{0,-2}, & P_{1,-2} \end{pmatrix} = \frac{1}{16} \begin{pmatrix} -1 & 0 & -1 \\ 0 & 8 & 0 \\ 2 & 0 & 2 \\ 0 & 8 & 0 \\ -1 & 0 & -1 \end{pmatrix}.$$

13. The image processing apparatus of claim 5, wherein the data processing circuitry first applies one or more midpoint pixel filling filters to generate a set of midpoint interpolated data values located at midpoints between the positions in the data array having data values from the initial set of image data;

the data processing circuitry next applies a two-dimensional center quarter-point pixel filling filter to generate a data value $f_{k,l}$ at a position (k,l) that is located on a diagonal line between a first position of the data array having a defined value from the initial set of image data and a second position located at a midpoint of a diagonal line segment between the first position and a third position of the data array having a defined value from the initial set of image data;

the only non-zero PFF coefficients in the applied quarter-point pixel filling filter are:

$$\begin{pmatrix} Q_{-3,5}, & Q_{-1,5}, & Q_{1,5}, & Q_{3,5}, & Q_{5,5} \\ Q_{-3,3}, & Q_{-1,3}, & Q_{1,3}, & Q_{3,3}, & Q_{5,3} \\ Q_{-3,1}, & Q_{-1,1}, & Q_{1,1}, & Q_{3,1}, & Q_{5,1} \\ Q_{-3,-1}, & Q_{-1,-1}, & Q_{1,-1}, & Q_{3,-1}, & Q_{5,-1} \\ Q_{-3,-3}, & Q_{-1,-3}, & Q_{1,-3}, & Q_{3,-3}, & Q_{5,-3} \end{pmatrix} = \frac{1}{16} \begin{pmatrix} 0 & 0 & -1 & 0 & 0 \\ 0 & 0 & 0 & 0 & 0 \\ 1 & 0 & 12 & 0 & -1 \\ 0 & 4 & 0 & 0 & 0 \\ 0 & 0 & 1 & 0 & 0 \end{pmatrix}.$$

14. The image processing apparatus of claim 5, wherein the data processing circuitry first applies one or more midpoint pixel filling filters to generate a set of midpoint interpolated data values located at midpoints between the positions in the data array having data values from the initial set of image data;

the data processing circuitry next applies a two-dimensional center quarter-point pixel filling filter to generate a data value $f_{k,l}$ at a position (k,l) that is located on a horizontal line between two of the midpoints in the data array, and that it is not horizontally colinear with any of the positions in the having data values from the initial set of image data;

the only non-zero PFF coefficients in the applied quarter-point pixel filling filter are:

$$\begin{pmatrix} Q_{-3,6}, & Q_{-1,6}, & Q_{1,6}, & Q_{3,6}, & Q_{5,6} \\ Q_{-3,4}, & Q_{-1,4}, & Q_{1,4}, & Q_{3,4}, & Q_{5,4} \\ Q_{-3,2}, & Q_{-1,2}, & Q_{1,2}, & Q_{3,2}, & Q_{5,2} \\ Q_{-3,0}, & Q_{-1,0}, & Q_{1,0}, & Q_{3,0}, & Q_{5,0} \\ Q_{-3,-2}, & Q_{-1,-2}, & Q_{1,-2}, & Q_{3,-2}, & Q_{5,-2} \end{pmatrix} = \frac{1}{32} \begin{pmatrix} 0 & 0 & -2 & 0 & 0 \\ 0 & 0 & 0 & 0 & 0 \\ 1 & 0 & 12 & 0 & -1 \\ 0 & 8 & 8 & 0 & 0 \\ -2 & 8 & 0 & 0 & 0 \end{pmatrix}.$$

15. The image processing apparatus of claim 5, wherein the data processing circuitry first applies one or more midpoint pixel filling filters to generate a set of midpoint interpolated data values located at midpoints between the positions in the data array having data values from the initial set of image data;

the data processing circuitry next applies a two-dimensional center quarter-point pixel filling filter to generate a data value $f_{k,l}$ at a quarter-point position (k,l) that is located in the middle of a square formed by one of the positions having a data value from the initial set of image data and three of the midpoints;

the only non-zero PFF coefficients in the applied quarter-point pixel filling filter are:

$$\begin{pmatrix} Q_{-3,3}, & Q_{-1,3}, & Q_{1,3}, & Q_{3,3}, & Q_{5,3} \\ Q_{-3,1}, & Q_{-1,1}, & Q_{1,1}, & Q_{3,1}, & Q_{5,1} \\ Q_{-3,-1}, & Q_{-1,-1}, & Q_{1,-1}, & Q_{3,-1}, & Q_{5,-1} \\ Q_{-3,-3}, & Q_{-1,-3}, & Q_{1,-3}, & Q_{3,-3}, & Q_{5,-3} \\ Q_{-3,-5}, & Q_{-1,-5}, & Q_{1,-5}, & Q_{3,-5}, & Q_{5,-5} \end{pmatrix} = \frac{1}{32} \begin{pmatrix} 0 & 0 & -1 & 0 & 0 \\ 0 & 8 & 8 & 0 & 0 \\ -1 & 8 & 12 & 0 & -1 \\ 0 & 0 & 0 & 0 & 0 \\ 0 & 0 & -1 & 0 & 0 \end{pmatrix}.$$

16. The image processing apparatus of claim 5, wherein the data array includes original data positions having data values from the initial set of image data, midpoint positions located at midpoints between the original data positions, and quarter-point positions located at midpoints between the positions defined by the original data positions and midpoint positions;

the data processing circuitry next applies a two-dimensional center quarter-point pixel filling filter to generate a data value $f_{k,l}$ at a position (k,l) that is located on a diagonal line between a first position of the data array having a defined value from the initial set of image data and a second position located at a midpoint of a diagonal line segment between the first position and a third position of the data array having a defined value from the initial set of image data;

the only non-zero PFF coefficients in the applied quarter-point pixel filling filter are:

$$\begin{pmatrix} T_{-7,5}, & T_{-3,5}, & T_{1,5}, & T_{5,5} \\ T_{-7,1}, & T_{-3,1}, & T_{1,1}, & T_{5,1} \\ T_{-7,-3}, & T_{-3,-3}, & T_{1,-3}, & T_{5,-3} \\ T_{-7,-7}, & T_{-3,-7}, & T_{1,-7}, & T_{5,-7} \end{pmatrix} = \frac{1}{128} \begin{pmatrix} 0 & -1 & -8 & 0 \\ -2 & 21 & 100 & -8 \\ -1 & 10 & 21 & -1 \\ 0 & -1 & -2 & 0 \end{pmatrix}.$$

17. The image processing apparatus of claim 5, wherein the data array includes original data positions having data values from the initial set of image data, midpoint positions located at midpoints between the original data positions, and quarter-point positions located at midpoints between the positions defined by the original data positions and midpoint positions;

the data processing circuitry next applies a two-dimensional center quarter-point pixel filling filter to generate a data value $f_{k,l}$ at a position (k,l) that is located on a horizontal line between two of the midpoints in the data array, and that it is not horizontally colinear with any of the positions in the having data values from the initial set of image data;

the only non-zero PFF coefficients in the applied quarter-point pixel filling filter are:

$$\begin{pmatrix} T_{-7,6} & T_{-3,6} & T_{1,6} & T_{5,6} \\ T_{-7,2} & T_{-3,2} & T_{1,2} & T_{5,2} \\ T_{-7,-2} & T_{-3,-2} & T_{1,-2} & T_{5,-2} \\ T_{-7,-6} & T_{-3,-6} & T_{1,-6} & T_{5,-6} \end{pmatrix} = \frac{1}{128} \begin{pmatrix} 0 & -1 & -7 & 0 \\ -2 & 17 & 61 & -4 \\ -2 & 17 & 61 & -4 \\ 0 & -1 & -7 & 0 \end{pmatrix}.$$

18. The image processing apparatus of claim 5, wherein the data array includes original data positions having data values from the initial set of image data, midpoint positions located at midpoints between the original data positions, and quarter-point positions located at midpoints between the positions defined by the original data positions and midpoint positions;

the data processing circuitry applies a two-dimensional center quarter-point pixel filling filter to generate a data value $f_{k,l}$ at a quarter-point position (k,l) that is located in the middle of a square formed by one of the positions having a data value from the initial set of image data and three of the midpoints;

the only non-zero PFF coefficients in the applied quarter-point pixel filling filter are:

$$\begin{pmatrix} T_{-7,7} & T_{-3,7} & T_{1,7} & T_{5,7} \\ T_{-7,3} & T_{-3,3} & T_{1,3} & T_{5,3} \\ T_{-7,-1} & T_{-3,-1} & T_{1,-1} & T_{5,-1} \\ T_{-7,-5} & T_{-3,-5} & T_{1,-5} & T_{5,-5} \end{pmatrix} = \frac{1}{128} \begin{pmatrix} 0 & -1 & -2 & 0 \\ -1 & 10 & 21 & -1 \\ -2 & 21 & 100 & -8 \\ 0 & -1 & -8 & 0 \end{pmatrix}.$$

19. The image processing apparatus of claim 5, wherein the initial set of image data includes values for alternating horizontal rows of the data array;

the data processing circuitry generates values for a horizontal row of the data array that does not have values from the initial set of image data by applying a vertical midpoint pixel filling filter in accordance with the filter equation; and the only non-zero coefficient values for the vertical midpoint pixel filling filter are:

$$(P_{0,-3}, P_{0,-1}, P_{0,1}, P_{0,3}) = \frac{1}{16}(-1, 9, 9, -1).$$

20. A general-purpose computing apparatus for generating interpolated pixel data values, comprising:

a data processing unit; and a memory coupled to the data processing unit, including:
an image storage area for storing an initial set of image data, comprising a subset of data values in a data array $f_{k,l}$ representing data values at corresponding positions (k,l); such that some of the $f_{k,l}$ values are initially undefined; and an image processing module for generating, in conjunction with the data processing unit, interpolated values for initially undefined $f_{k,l}$ values in accordance with the filter equation:

$$f_{k,l} = \sum_{i,j} P_{k-2ni,l-2nj} d_{i,j}$$

wherein n is a positive integer;

$d_{i,j}$ are the subset of $f_{k,l}$ values which have defined values prior to the generation of the interpolated $f_{k,l}$ values, such that $f_{2ni,2nj} = d_{i,j}$ for integer values of i and j that fall within the initial set of image data;

$P_{k,l}$ are coefficients, no more than eighteen of which have non-zero values;

each non-zero $P_{k,l}$ coefficient is an integer divided by an integer power of two; and the set of interpolated $f_{k,l}$ values in conjunction with the $d_{i,j}$ values represent a smooth surface that is continuous, and that has a two-dimensional spatial first derivative that is continuous.

21. The general-purpose computing apparatus of claim 20, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a tangent plane formed by adjacent ones of the data points (k,l) corresponding to data values $d_{i,j}$.

22. The general-purpose computing apparatus of claim 20, wherein whenever a local contiguous set of the initial data values $d_{i,j}$ all fall on a polynomial surface, the interpolated $f_{k,l}$ values that are located between the initial data points also fall on that same polynomial surface.

23. The general-purpose computing apparatus of claim 20, wherein the non-zero $P_{k,l}$ coefficients, when summed, have an associated sum equal to 1.

24. A computer program product for generating interpolated pixel data values, for use in conjunction with a computer system, the computer program product comprising a computer readable storage medium and a computer program mechanism embedded therein, the computer program mechanism comprising:

an image module including instructions for providing an initial set of image data, comprising a subset of data values in a data array $f_{k,l}$ representing data values at corresponding positions (k,l), such that some of the $f_{k,l}$ values are initially undefined; and a pixel filling filter module including instructions for generating an interpolated value for initially undefined $f_{k,l}$ values in accordance with the filter equation:

$$f_{k,l} = \sum_{i,j} P_{k-2ni,l-2nj} d_{i,j}$$

wherein n is a positive integer;

$d_{i,j}$ are the subset of $f_{k,l}$ values which have defined values prior to the generation of the interpolated $f_{k,l}$ values, such that $f_{2ni,2nj} = d_{i,j}$ for integer values of i and j that fall within the initial set of image data;

$P_{k,l}$ are coefficients, no more than twelve of which have non-zero values;

each non-zero $P_{k,l}$ coefficient is an integer divided by an integer power of two; and the set of interpolated $f_{k,l}$ values in conjunction with the $d_{i,j}$ values represent a smooth surface that is continuous, and that has a two-dimensional spatial first derivative that is continuous.

25. The computer program product of claim 24, wherein the smooth surface represented by the set of interpolated $f_{k,l}$ values in conjunction with the $d_{i,j}$ values has at each of a plurality of locations (k,l) for which an interpolated value is generated a tangent plane that is substantially parallel to a tangent plane formed by adjacent ones of the data points (k,l) corresponding to data values $d_{i,j}$.

26. The computer program product of claim 24, wherein whenever a local contiguous set of the initial data values $f_{k,l}$, for k and l both even numbers, all fall on a polynomial surface, the interpolated $f_{k,l}$ values that are located between the initial data points also fall on that same polynomial surface.

27. The computer program product of claim 24, wherein the non-zero $P_{k,l}$ coefficients, when summed, have an associated sum equal to 1.

28. A method of generating interpolated pixel data values, comprising:

providing an initial set of image data, comprising a subset of data values in a data array $g_{r,s}$ representing data values at corresponding positions (r,s); such that some of the $g_{r,s}$ values are initially undefined;

generating an interpolated value for each of a plurality of initially undefined $g_{r,s}$ values in accordance with the filter equation:

$$g_{r,s} = \sum_{i,j} T_{r-4i,s-4j} d_{ij}$$

wherein $d_{i,j}$ are the subset of $g_{r,s}$ values which have defined values prior to the generation of the interpolated $g_{r,s}$ values, such that $g_{4i,4j}=d_{i,j}$ for integer values of i and j that fall within the initial set of image data;

$T_{r-4i,s-4j}$ are coefficients, no more than sixteen of which have non-zero values;

each non-zero $T_{r-4i,s-4j}$ coefficient is an integer divided by an integer power of two; and the set of interpolated $g_{r,s}$ values in conjunction with the $d_{i,j}$ values represent a smooth surface that is continuous, and that has a two-dimensional spatial first derivative that is continuous.

29. A method of generating interpolated pixel data values, comprising:

providing an initial set of image data, comprising a subset of data values in a data array $f_{k,l}$ representing data values at corresponding positions (k,l), such that some of the $f_{k,l}$ values are initially undefined;

generating an interpolated value for each of a plurality of initially undefined $f_{k,l}$ values in accordance with the filter equation:

$$f_{k,l} = \sum_{i,j} P_{k-2i,l-2j} d_{i,j}$$

wherein $d_{i,j}$ are the subset of $f_{k,l}$ values which have defined values prior to the generation of the interpolated $f_{k,l}$ values, such that $f_{2i,2j}=d_{i,j}$ for integer values of i and j that fall within the initial set of image data;

$P_{k-2i,l-2j}$ are coefficients, no more than twelve of which have non-zero values; and each non-zero $P_{k-2i,l-2j}$ coefficient is an integer divided by an integer power of two;

providing a data array $g_{r,s}$ representing data values at corresponding positions (r,s) including the data values in the data array $f_{k,l}$ such that $g_{2k,2l}=f_{k,l}$ for integer values of k and l that fall within the data array $f_{k,l}$ and such that the other $g_{r,s}$ values are initially undefined; and generating an interpolated value for each of a plurality of initially undefined $g_{r,s}$ values in accordance with the filter equation:

$$g_{r,s} = \sum_{k,l} Q_{r-2k,s-2l} f_{k,l}$$

wherein $Q_{r-2k,s-2l}$ are coefficients, no more than eight of which have non-zero values; and each non-zero $Q_{r-2k,s-2l}$ coefficient is an integer divided by an integer power of two.

30. A method of generating interpolated pixel data values for an image when magnifying the image by a magnification factor that is not equal to an integer power of four, comprising:

performing a first stage magnification of the image, followed by a second stage magnification of the image;

the step of performing the first stage magnification of the image including:

selecting a largest power of four, n, that is smaller than the magnification factor;

providing an initial set of image data, comprising a subset of data values in a data array $h_{t,u}$ representing data values at corresponding positions (t,u) in the image magnified by a factor of n; such that some of the $h_{t,u}$ values are initially undefined; and generating an interpolated value for each of a plurality of initially undefined $h_{t,u}$ values in accordance with the FIR filter equation:

$$h_{t,u} = \sum_{i,j} W_{t-\sqrt{n}i, u-\sqrt{n}j} d_{ij}$$

wherein $d_{i,j}$ are the subset of $h_{t,u}$ values which have defined values prior to the generation of the interpolated $h_{t,u}$ values, such that $h_{\sqrt{n}i,\sqrt{n}j}=d_{i,j}$ for integer values of i and j that fall within the initial set of image data, and $W_{t,u}$ are coefficients; and wherein the set of interpolated $h_{t,u}$ values in conjunction with the $d_{i,j}$ values represent a smooth surface that is continuous, and that has a two-dimensional spatial first derivative that is continuous;

the step of performing the second stage magnification of the image including:

remapping data values in the data array $h_{t,u}$ to new positions (t',u') based on the magnification factor; and generating an interpolated value at positions (t,u) in the image that did not receive a data value from the remapping step by interpolating, for each such position, at least one data value from at least one corresponding position (t',u').

31. The method of claim 30, wherein the generating step includes:

selecting three remapped data values at positions (t',u') closest to the position (t,u); and generating the interpolated value at the position (t,u) with Barycentric interpolation using the three closest remapped pixels.

32. The method of claim 31, wherein the smooth surface represented by the set of interpolated $h_{t,u}$ values in conjunction with the $d_{i,j}$ values has at each of a plurality of locations (k,l) for which an interpolated value is generated a tangent plane that is parallel to a tangent plane formed by adjacent ones of the data points (k,l) corresponding to data values $d_{i,j}$.

33. The method of claim 31, wherein whenever a local contiguous set of the initial data values $h_{t,u}$ for k and l both even numbers, all fall on a polynomial surface, the interpolated $h_{t,u}$ values that are located between the initial data points also fall on that same polynomial surface.

34. The method of claim 31, wherein the non-zero $W_{t,u}$ coefficients, when summed, have an associated sum equal to 1.

35. The method of claim 30, wherein no more than eighteen of the $W_{t,u}$ coefficients have non-zero values; and each non-zero $W_{t,u}$ coefficient is a equal to an integer divided by an integer power of two.

36. A computer program product for generating interpolated pixel data values for an image when magnifying the image by a factor that is not equal to an integer power of four, for use in conjunction with a computer system, the computer program product comprising a computer readable storage medium and a computer program mechanism embedded therein, the computer program mechanism comprising:

an image module including instructions for providing an initial set of image data, comprising a subset of data values in a data array $h_{t,u}$ representing data values at corresponding positions (t,u) in the image magnified by a factor of n; such that some of the $h_{t,u}$ values are initially undefined;

instructions for selecting a largest power of four, n, that is smaller than the magnification factor;

a pixel filling filter module including instructions for generating an interpolated value for each of a plurality of initially undefined $h_{t,u}$ values in accordance with the FIR filter equation:

$$h_{t,u} = \sum_{i,j} W_{t-\sqrt{ni},u-\sqrt{nj}} d_{ij}$$

wherein $d_{i,j}$ are the subset of $h_{t,u}$ values which have defined values prior to the generation of the interpolated $h_{t,u}$ values, such that $h_{\sqrt{ni},\sqrt{nj}}=d_{i,j}$ for integer values of i and j that fall within the initial set of image data, and $W_{t,u}$ are coefficients;

an image magnification module including instructions for:

remapping data values in the data array $h_{t,u}$ to new positions (t',u') based on the magnification factor; and generating in the image an interpolated value for positions (t,u) in the image that did not receive a data value from the remapping;

the instructions for generating an interpolated value at position (t,u) including instructions for:

selected three data values at remapped positions (t',u') closest to the position (t,u); and generating the interpolated value at the position (t,u) with Barycentric interpolation using the three selected data values.

37. An image processing apparatus for generating interpolated pixel data values for an image when magnifying the image by a factor that is not equal to an integer power of four, for use in conjunction with a computer system, comprising:

an image memory for storing an initial set of image data, comprising a subset of data values in a data array $f_{k,l}$ representing data values at corresponding positions (k,l); such that some of the $f_{k,l}$ values are initially undefined; and means for selecting a largest power of four, n, that is smaller than the magnification factor;

a pixel filling filter for generating an interpolated value for each of a plurality of initially undefined $h_{t,u}$ values in accordance with the FIR filter equation:

$$h_{t,u} = \sum_{i,j} W_{t-\sqrt{ni},u-\sqrt{nj}} d_{ij}$$

wherein $d_{i,j}$ are the subset of $h_{t,u}$ values which have defined values prior to the generation of the interpolated $h_{t,u}$ values, such that $h_{\sqrt{ni},\sqrt{nj}}=d_{i,j}$ for integer values of i and j that fall within the initial set of image data, and $W_{t,u}$ are coefficients; and an image magnification module that remaps data values in the data array $h_{t,u}$ to new positions (t',u') based on the magnification factor, and generates an interpolated value at positions (t,u) in the image that did not receive a data value from the remapping;

wherein the image magnification module generates an interpolated value for a position (t,u) by selecting three remapped data values at positions (t',u') closest to the position (t,u), and generating the interpolated value at the position (t,u) with Barycentric interpolation using the three selected remapped data values.

\* \* \* \* \*